United States Patent
Zeng et al.

(10) Patent No.: US 10,579,702 B2
(45) Date of Patent: Mar. 3, 2020

(54) SYSTEMS AND METHODS FOR SIGNAL PROCESSING USING COORDINATE DESCENT TECHNIQUES FOR UNIT MODULUS LEAST SQUARES (UMLS) AND UNIT-MODULUS QUADRATIC PROGRAM (UMQP)

(71) Applicant: City University of Hong Kong, Kowloon (HK)

(72) Inventors: Wen-Jun Zeng, Kowloon (HK); Hing Cheung So, Kowloon (HK); Jiayi Chen, Shenzhen (CN); Abdelhak M. Zoubir, Berlin (DE)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 15/957,657

(22) Filed: Apr. 19, 2018

(65) Prior Publication Data
US 2019/0325002 A1 Oct. 24, 2019

(51) Int. Cl.
G06F 17/11 (2006.01)
G06F 17/17 (2006.01)

(52) U.S. Cl.
CPC ............ *G06F 17/11* (2013.01); *G06F 17/17* (2013.01)

(58) Field of Classification Search
None
See application file for complete search history.

(56) References Cited

U.S. PATENT DOCUMENTS

| | | | |
|---|---|---|---|
| 7,110,349 B2 | 9/2006 | Branlund et al. |
| 7,123,676 B2 | 10/2006 | Gebara et al. |
| 7,366,244 B2 | 4/2008 | Gebara et al. |
| 7,729,431 B2 | 6/2010 | Gebara et al. |
| 7,751,510 B2 | 7/2010 | Budianu et al. |

(Continued)

OTHER PUBLICATIONS

Luo, Z.-Q. et al., "Semidefinite relaxation of quadratic optimization problems," IEEE Signal Processing Magazine, vol. 27, No. 3, pp. 20-34, May 2010.

(Continued)

*Primary Examiner* — David H Malzahn
(74) *Attorney, Agent, or Firm* — Norton Rose Fulbright US LLP

(57) ABSTRACT

The present disclosure relates to methods and systems for signal processing using coordinate descent technique for solving technical implementation problems that are expressed as unit-modulus least squares (UMLS) and unit-modulus quadratic program (UMQP) problems. Embodiments provide for iteratively minimizing an objective function of a signal vector associated with a UMLS/UMQP problem expression over a set of coordinates of the signal vector to a convergence point. The objective function is minimized with respect to a vector element corresponding to a selected coordinate index, while other vector elements that do not correspond to the selected coordinate index are fixed. Accordingly, at each iteration, minimizing the objective function involves a solution to a one-dimensional univariate quadratic minimization. Embodiments also provide various coordinate index selection rules that include a cyclic CD rule (CCD), a randomized CD rule (RCD), randomly permuted CD rule (RPCD), and a greedy CD rule (CCD).

20 Claims, 8 Drawing Sheets

(56) References Cited

U.S. PATENT DOCUMENTS

| | | |
|---|---|---|
| 7,929,478 B2 | 4/2011 | Kim et al. |
| 8,130,847 B2 | 3/2012 | Vook et al. |
| 8,130,867 B2 | 3/2012 | Budianu et al. |
| 8,254,241 B2 | 8/2012 | Branlund et al. |
| 8,396,163 B2 | 3/2013 | Collings et al. |
| 8,432,985 B2 | 4/2013 | Budianu et al. |
| 8,521,090 B2 | 8/2013 | Kim et al. |
| 8,565,681 B2 | 10/2013 | Kim et al. |
| 8,638,871 B2 | 1/2014 | Krauss et al. |
| 8,675,758 B2 | 5/2014 | Gorokhov et al. |
| 8,718,164 B2 | 5/2014 | Budianu et al. |
| 8,797,959 B2 | 8/2014 | Razaviyayn et al. |
| 8,811,512 B2 | 8/2014 | Gorokhov et al. |
| 8,879,428 B2 | 11/2014 | Hui et al. |
| 8,929,193 B2 | 1/2015 | Branlund et al. |
| 8,942,302 B2 | 1/2015 | Krishnamurthy et al. |
| 8,971,437 B2 | 3/2015 | Brown et al. |
| 8,976,884 B2 | 3/2015 | Krishnamurthy et al. |
| 8,989,050 B2 | 3/2015 | Cavalcante et al. |
| 9,054,767 B2 | 6/2015 | Razaviyayn et al. |
| 9,149,244 B2 | 10/2015 | Anderson |
| 9,264,809 B2 | 2/2016 | Forero et al. |
| 9,538,483 B2 | 1/2017 | Chen et al. |
| 9,584,909 B2 | 2/2017 | Heusdens et al. |
| 9,673,855 B2 | 6/2017 | Branlund et al. |
| 9,743,397 B2 | 8/2017 | Cvalcante et al. |
| 2012/0146637 A1* | 6/2012 | Zhu .................. G01R 33/48 324/307 |
| 2017/0161231 A1* | 6/2017 | Liu .................... G06F 17/11 |
| 2018/0129630 A1* | 5/2018 | Zeng .................. G06F 17/11 |

OTHER PUBLICATIONS

Tranter, J. et al., "Fast unit-modulus least squares with applications in beamforming," IEEE Transactions on Signal Processing, vol. 65, No. 11, pp. 2875-2887, Jun. 2017.

Boumal, N., "Nonconvex phase synchronization," SIAM Journal on Optimzation, vol. 26, pp. 2355-2377, 2016.

Liu, H. et al., "On the estimation performance and convergence rate of the generalized power method for phase synchronization," SIAM Journal on Optimization, vol. 27, pp. 2426-2446, 2017.

Nesterov, Y., "Efficiency of coordinate-descent methods on huge-scale optimization problems," SIAM Journal on Optimization, vol. 22, No. 2, pp. 341-362, 2012.

Wright, S.J., "Coordinate descent algorithms," Mathematical Programming Series A, vol. 151, No. 1, pp. 3-34, Jun. 2015.

* cited by examiner

SYSTEMS AND METHODS FOR SIGNAL PROCESSING USING COORDINATE DESCENT TECHNIQUES FOR UNIT MODULUS LEAST SQUARES (UMLS) AND UNIT-MODULUS QUADRATIC PROGRAM (UMQP)

TECHNICAL FIELD

The present invention relates generally to communication technology, and more particularly to signal processing that may be expressed as unit-modulus least squares (UMLS) and unit-modulus quadratic program (UMQP) problems in a communications network.

BACKGROUND OF THE INVENTION

There are many current technological applications in which implementation of particular features may give rise to problems that may be expressed as optimization, estimation, and/or approximation problems. For example, implementing applications related to radar, communications, computer vision, optics, signal processing, distributed networks, etc., may give rise to technical implementation problems that may be expressed as unit-modulus least squares (UMLS) problems. UMLS problems can also be recast to a generalized form, namely, as unit-modulus quadratic program (UMQP) problems. In one particular example, which is discussed in more detail below, symbol detection in multiple-input multiple-output (MIMO) communications may involve estimating a signal vector, which may be expressed as a UMLS problem. Thus, implementing MIMO detection may give rise to technical implementation problems that may be expressed as a UMLS problem. Other particular examples of implementations that may involve signal processing problems that may be expressed as UMLS/UMQP problem expressions may include phase-only beamforming, source localization, phase synchronization, phase retrieval, etc.

Thus, solving these technical implementation problems expressed as UMLS/UMQP problem expressions may involve solving a generalized UMLS/UMQP problem. In general terms, a solution to a UMLS/UMQP problem may involve optimizing a multivariate least squares or quadratic function subject to the constraint that all variables have unit magnitudes. Some solutions have been proposed to solve the generalized UMLS/UMQP problems.

One such solution to the UMLS/UMQP problem is based on the semi-definite relaxation (SDR) approach. As will be discussed in further detail below, the general UMLS/UMQP problem is nonconvex and is also non-deterministic polynomial-hard (NP-hard) due to unit-modulus constraints. The SDR approach involves relaxing the nonconvex constraint to a convex optimization problem. However, SDR lifts the problem dimension and requires solving a much larger-scale convex problem. As such, an implementation using SDR will have a high computational complexity and may not be suitable for large-scale scenarios.

Another solution to the UMLS/UMQP problem that has been proposed is the gradient projection (GP) approach. Under the GP approach, as will be discussed in more detail below, at each iteration of the optimization, the solution is first updated along the negative gradient direction, and then the result is projected back to the constraint set to ensure all the iterates satisfy the unit-modulus requirement. However, the convergence rate of the GP approach may be slow. As such, any system implemented using GP may require a large number of iterations to obtain a satisfactory accuracy of results.

BRIEF SUMMARY OF THE INVENTION

The present invention is directed to methods and systems which provide rule sets to implement an iterative coordinate descent (CD) algorithmic framework to solve technical implementation problems that may be expressed as UMLS/UMQP problem expressions. It is noted that, herein, the term "UMLS/UMQP problem expression" may refer to the expression of a problem in the implementation of a technical feature in a technological application as a UMLS/UMQP problem. Thus, a solution to a "UMLS/UMQP problem expression" may be utilized as a technical solution to the technical implementation problem expressed as the "UMLS/UMQP problem expression." Therefore, it will be appreciated that embodiments of the present disclosure provide a technological improvement to existing technological systems by providing means by which a UMLS/UMQP problem expression in a system may be solved. For example, as described in more detail below, UMLS/UMQP problem expressions in MIMO detection, source localization, and phase synchronization may be advantageously solved using the CD techniques in accordance with the present disclosure.

In operation according to embodiments of the present disclosure, a UMLS/UMQP problem expression may be expressed as a minimization of an objective function of a vector subject to the constraint that all elements of the vector have unit magnitudes. The objective function of the vector may be iteratively minimized over a set of coordinates of the vector to a convergence point. Thus, in embodiments, a solution to the UMLS/UMQP problem expression may be found as the convergence point to which the objective function of the vector is iteratively minimized. At each iteration, a coordinate index may be selected.

In some embodiments of the present disclosure, a framework of various coordinate index selection rules that include a cyclic CD rule (CCD), a randomized CD rule (RCD), randomly permuted CD rule (RPCD), and a greedy CD rule (GCD) may be provided. In operation, the various coordinate index selection rules may be applied to select a coordinate index at each iteration of the CD process.

In embodiments, the objective function may be minimized with respect to the vector element corresponding to the selected coordinate index, while the other vector elements of the signal vector that do not correspond to the selected coordinate index are fixed during the iteration such that these other vector elements do not change at the iteration. As such, in embodiments, at each iteration, minimizing the objective function involves a solution to a one-dimensional univariate quadratic minimization. Furthermore, CD processes discussed herein exhibit global convergence to a Karush-Kuhn-Tucker (KKT) point of the UMLS/UMQP problem expression. Thus, the objective function of the signal vector may be iteratively minimized such that the signal vector converges to a KKT point. In embodiments, the global convergence to a KKT point of the CD processes disclosed herein may be from any initial value for the signal vector.

In light of foregoing, it should be appreciated that the CD approaches provided by the rule sets disclosed herein may be scalable, computationally simpler than current approaches, such as SDR, and converge to a solution faster than current approaches such as GP.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
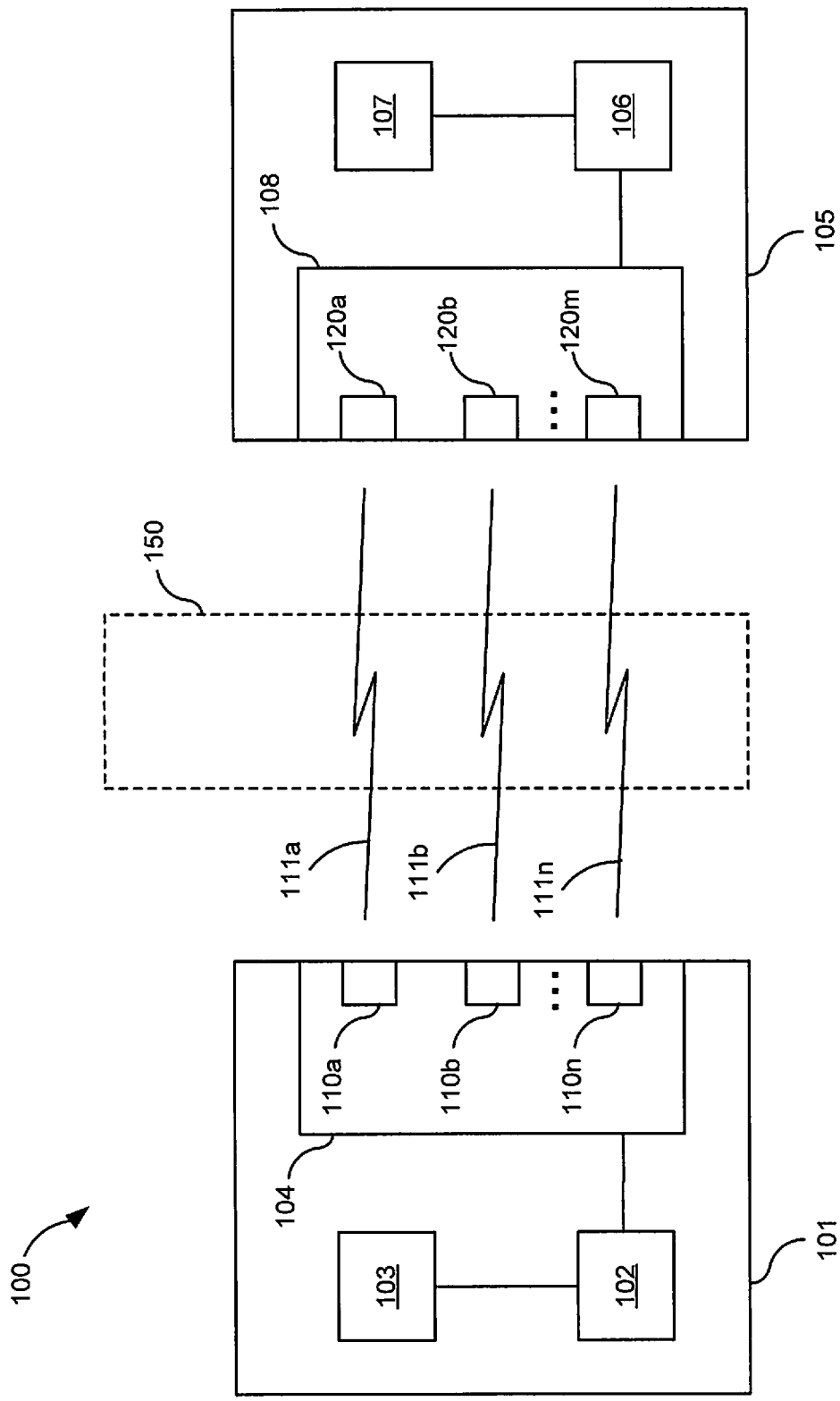
FIG. 1 shows a communication system configured to perform operations in accordance with embodiments of the invention.

FIG. 1 illustrates a wireless communication system 100 configured in accordance with aspects of the present disclosure. The configuration of system 100 may facilitate implementation of rule sets that facilitate a solution to a UMLS/UMQP problem expression that may be utilized to solve technical implementation problems in the design and operations of system 100. As shown in FIG. 1, system 100 may include at least one network device 101 and at least one network device 105.

System 100 may comprise a communication network, such as a wireless communication network, a cellular network, a cable transmission system, a Local Area Network (LAN), a Wireless LAN (WLAN), a Metropolitan Area Network (MAN), a Wide Area Network (WAN), the Internet, the Public Switched Telephone Network (PSTN), etc., that may be configured to facilitate communications between network devices 101 and 105. In some embodiments, system 100 may be configured to facilitate communications using communication links according to one or more communication protocols or standards (e.g., a cellular communication protocol such as a $3^{rd}$ Generation (3G) protocol, a $4^{th}$ Generation (4G)/long term evolution (LTE) protocol, a $5^{th}$ Generation (5G) protocol, Bluetooth protocol, Bluetooth Low Energy (BLE) protocol, a wireless local area network (WLAN) protocol such as an 802.11 protocol, an 802.16 protocol, radio frequency (RF) communication protocols, and/or proprietary communication protocols, etc.).

In some embodiments, network device 101 and/or network device 105 may be a base station, such as an evolved node B (eNodeB), a macro cell, a femtocell, a pico cell, or another type of base station (e.g., access point, network "hot spot" device, etc.), or a part thereof. In embodiments, network device 101 and/or network device 105 may be a user equipment, such as a mobile device, a smartphone, a tablet computing device, a personal computing device, a laptop computing device, a desktop computing device, a computer system of a vehicle, a personal digital assistant (PDA), a smart watch, a global positioning system (GPS) device, etc.

In some aspects, network device 101 may comprise processor 102 and memory 103. Memory 103 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 103 may be communicatively coupled to processor 102, and may store instructions that, when executed by processor 102, cause processor 102 to perform operations in accordance with the present disclosure. Network device 105 may comprise processor 106 and memory 107. Memory 107 may be communicatively coupled to processor 106, and may store instructions that, when executed by processor 106, cause processor 106 to perform operations in accordance with the present disclosure.

In embodiments, system 100 may be configured for multiple-input multiple-output (MIMO) communications. In this case, a transmission may include multiple signals that may be transmitted concurrently over MIMO channel 150, and the multiple signals may be received and combined to detect the transmission. In aspects, the multiple signals may be combined in a signal vector to detect transmission symbols.

Network device 101 may also include transmitter 104. Transmitter 104 may be configured to transmit multiple signals over a MIMO channel. In some embodiments, transmitter 104 may include a plurality of transmitting modules 110a-n respectively configured to transmit signals 111a-n over MIMO channel 150. In some aspects, transmitting modules 110a-n may each be a transmitter, such as a radio transmitter, transceiver etc. In other embodiments, transmitting modules 110a-n may each be an antenna communicatively coupled to transmitter 104 and configured to transmit signals 111a-n.

Network device 105 may also include receiver 108. Receiver 108 may be configured to receive multiple signals transmitted over a MIMO channel. In some embodiments, receiver 108 may include a plurality of receiving modules 120a-m, each of which may be configured to receive signals 111a-n over MIMO channel 150. In some aspects, receiving modules 120a-m may each be a receiver, such as a radio receiver, transceiver etc. In other embodiments, receiving modules 120a-m may each be an antenna communicatively coupled to receiver 108 and configured to receive each of signals 111a-n.

During operation, and as will be discussed in more detail below, the transmission of signals 111a-n may include transmission of symbols in each of signals 111a-n, which may be detected at receiver 105. As noted above, multiple signals 111a-n may be propagated through the MIMO channel 150, and each of signals 111a-n may be received by receiver 105. Thus, in aspects, each of receiving modules 120a-m may receive an instance of signals 111a-n. The signals received at each of receiving modules 120a-m are combined into a signal vector representing the transmission from transmitter 101. In this case, the detection of the transmitted symbols may be expressed as a UMLS problem expression, as shown below, which may be solved using the CD techniques disclosed herein.

For example, in aspects, a particular signal emitted at the ith transmitting module may be denoted by vector element $x_i$ and all symbols in signals 111a-n may be collected in a signal vector $x=[x_1, \ldots, x_n]^T$. Signal vector x may adopt an M-ary phase-shift keying constellation in accordance with the following formulation:

$$x_i \in \mathcal{M} = \left\{ e^{\frac{j2\pi(i-1)}{M}}, i = 1, \ldots, M \right\}. \quad (1)$$

As noted above, the transmitted symbols may propagate through MIMO channel 150. In this case, MIMO channel 150 may be characterized by $A \in \mathbb{C}^{m \times n}$, and the received signal at each of receiving modules 110a-m may be expressed as $b=Ax+v$, where v may represent a white Gaussian noise vector. In these embodiments, symbols may be detected using a maximum likelihood (ML) detector for signal vector x. In some embodiments, as discussed herein, the ML detector may be implemented as software, hardware, or a combination thereof, in receiver 105. The ML detector may be obtained in accordance with the following minimization formulation:

$$\min_{x \in \mathbb{C}^n} \|Ax - b\|^2 \text{ s.t. } x_i \in \mathcal{M}, i = 1, \ldots, n \quad (2)$$

As will be appreciated, the formulation of the MIMO detection problem in equation (2) is constrained to a discrete set which may only contain M elements. As such, the MIMO detection problem in equation (2) may be solved using the inventive CD approaches of embodiments of the present disclosure to solve a UMLS problem expression. These inventive CD approaches for solving a UMLS problem expression will be discussed in more detail below. It is noted that, in some embodiments, application of the CD approaches to the MIMO detection problem in equation (2) may operate to relax the discrete constraint, but may also include application of a hard decision to the UMLS solution. For example, in some cases, the UMLS solution may not exactly align with symbols corresponding to finite points on the unit circle. In this cases, for each estimated element in the UMLS solution, a hard decision may refer to selecting the closest symbol as the final estimate.

Figure 2:
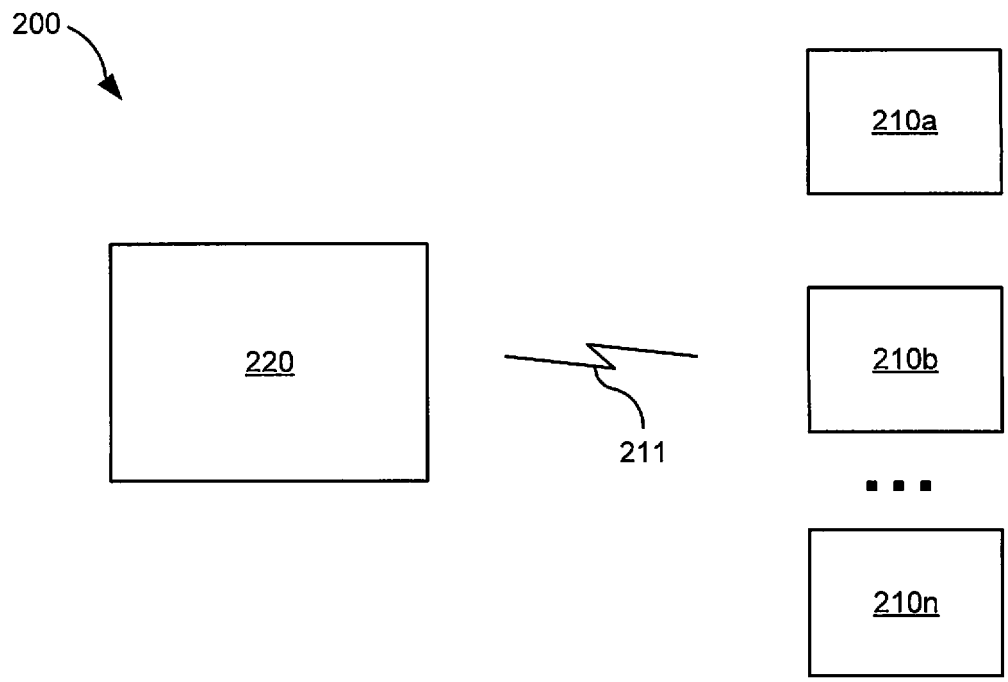
FIG. 2 shows another configuration of a communication system configured to perform operations in accordance with embodiments of the invention.

FIG. 2 illustrates a wireless communication system 200 configured in accordance with another aspect of the present disclosure. The configuration of system 200 may facilitate implementation of rule sets that allow a solution to UMLS/UMQP problem expressions that may be utilized in implementations of source localization operations in system 200. System 200 may comprise a communication network, which may be configured with functionality that may be similar to the functionality of the communication network in system 100 discussed with reference to FIG. 1 above. As shown in FIG. 2, system 200 may include receivers 210a-n and at least one source transmitter 220. It is noted that the functionality of receivers 210a-n and source transmitter 220 may be similar to the functionality of the receivers and transmitters illustrated and discussed above with reference to FIG. 1. In some embodiments, each of receivers 210a-n may be separate network devices configured to receive transmissions from source transmitter 220. In other embodiments, each of receivers 210a-n may be receiving modules that are part of a single receiver. In this case, each of receivers 210a-n may represent a receiver, or may represent an antenna coupled to a single receiver. In each case, however, it will be appreciated that each of receivers 210a-n may be configured to receive signal 211 from source transmitter 220.

In some embodiments, system 200 may be a two-dimensional range-based positioning system, and each corresponding receiver of receivers 210a-n may have known coordinates $\{(\alpha_i, \beta_i) \in \mathbb{R}^2\}_{i=1}^n$, while source transmitter 220's coordinates may be unknown, but may be represented as $(\alpha, \beta)$. In these embodiments, the measured distance between source transmitter 220 and the ith receiver, denoted by $\gamma_i$, may be expressed in accordance with the following formulation:

$$\gamma_i = \sqrt{(\alpha - \alpha_i)^2 + (\beta - \beta_i)^2} + v_i, \quad i = 1, \ldots, n \quad (3)$$

where $\{v_i\}_{i=1}^n$ are the additive noise components of the signals received at the receivers.

In some embodiments, system 200 may be a time-synchronized system. In this case, the range between the source transmitter and a particular receiver may be estimated by measuring the time-of-arrival, namely, the one-way propagation time of a signal traveling between the source transmitter and the particular receiver, and then multiplying the measured time by the known propagation speed. In other embodiments, system 200 may be a received signal strength-based positioning system. In this case, average power attenuation of a received signal may be utilized to determine the range between the source transmitter and a particular receiver according to a signal path-loss model. In these embodiments, source localization may refer to finding the location $(\alpha,\beta)$ of the source transmitter, e.g., source transmitter 220, given the measured distance at each of the receivers $\{\gamma_i\}_{i=1}^n$ and the known coordinates of receivers 210a-n $\{\alpha_i, \beta_i\}_{i=1}^n$.

In embodiments, when the noise is white Gaussian distributed, the ML estimate of the source transmitter location may be obtained by solving the following:

$$\min_{(\alpha,\beta)} f(\alpha, \beta) := \sum_{i=1}^{n} \left(\sqrt{(\alpha - \alpha_i)^2 + (\beta - \beta_i)^2} + \gamma_i\right)^2 \quad (4)$$

which may present a challenge as this problem is not only nonlinear but also nonconvex. However, in accordance with the present disclosure, the problem formulated in equation (4) may be converted to a UMLS problem expression and thus, it may be solved using the inventive CD approaches of embodiments of the present disclosure. A description of the conversion of the problem into a UMLS formulation now follows.

In this example, complex number notation may be used to represent the coordinates, and thus, $z=\alpha+j\beta$ and $\{\zeta_i=\alpha_i+j\beta_i\}_{i=1}^n$ may denote the coordinates of source transmitter 220 and each corresponding receiver of receivers 210a-n in complex number notation. Thus, the distance from the source transmitter to the ith receiver may be expressed as $|z-\zeta_i|$. Accordingly, the problem formulated in equation (4) may be equivalent to:

$$\min_{z \in \mathbb{C}} f(z) := \sum_{i=1}^{n} (|z - \zeta_i| - \gamma_i)^2 \quad (5)$$

Furthermore, by introducing auxiliary unit-modulus variables $\{u_i = e^{j\angle(z-\zeta_i)}\}_{i=1}^n$, it may be shown that the formulation in equation (5) may be expressed as:

$$\min_{z \in \mathbb{C}, |u_i|=1} \sum_{i=1}^{n} |z - \zeta_i - \gamma_i u_i|^2 \quad (6)$$

Defining $\zeta = [\zeta_1, \ldots, \zeta_n]^T$, $\gamma = [\gamma_1, \ldots, \gamma_n]^T$, and $u = [u_1, \ldots, u_n]^T$, the formulation in equation (6) may be compactly written as:

$$\min_{z \in \mathbb{C}, |u_i|=1} \|1z - (\zeta + \gamma \odot u)\|^2 \quad (7)$$

For a fixed u, the optimal position of the source transmitter 220 may be given by the following formulation:

$$z = \frac{1}{n} 1^T (\zeta + \gamma \odot u) = \frac{1}{n} \sum_{i=1}^{n} (\zeta_i + \gamma_i u_i) \quad (8)$$

Accordingly, combining equations (7) and (8) eliminates z, which results in the following UMLS problem expression:

$$\min_{u \in \mathbb{C}^n} \|\Gamma u - \xi\|^2, \text{ s.t. } |u_i|^2 = 1, i = 1, \ldots, n \quad (9)$$

where $$\Gamma = \begin{bmatrix} \gamma_i & & \\ & \ddots & \\ & & \gamma_n \end{bmatrix} - \frac{1}{n} \begin{bmatrix} \gamma^T \\ \vdots \\ \gamma^T \end{bmatrix},$$

and $\xi = 1\bar{\zeta} - \zeta$ with $\bar{\zeta} = \sum_{i=1}^{n} \zeta_i / n$ being the mean of the positions of all receivers. As such, the source localization problem expressed as a UMLS problem expression in equation (9) may be solved using the inventive CD approaches of embodiments of the present disclosure, as discussed in further detail below. It is noted that, once equation (9) is solved in accordance with the CD approaches discussed herein, an estimate of the source transmitter coordinates may be computed in accordance with the following formulation:

$$\hat{z} = \bar{\zeta} + \frac{1}{n} \sum_{i=1}^{n} \gamma_i u_i. \quad (10)$$

Figure 3:
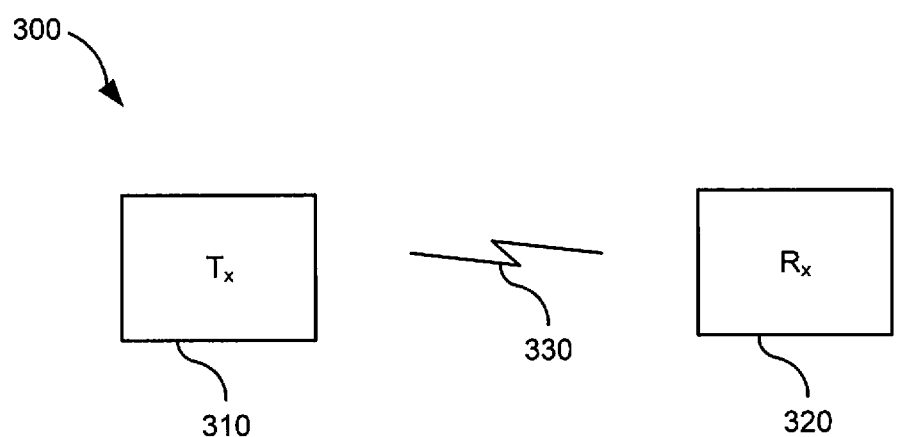
FIG. 3 shows yet another configuration of a communication system configured to perform operations in accordance with embodiments of the invention.

FIG. 3 illustrates a wireless communication system 300 configured in accordance with yet another aspect of the present disclosure. The configuration of system 300 may facilitate implementation of rule sets that allow a solution to UMLS/UMQP problem expressions that may be utilized in implementations of phase synchronization operations in system 300. System 200 may comprise a communication network, which may be configured with functionality that may be similar to the functionality of the communication network in system 100 discussed with reference to FIG. 1 above. As shown in FIG. 3, system 300 may include at least one network device 310 and at least one network device 320. It is noted that the structure and functionality of network device 310 and network device 320 may be similar to the functionality of network devices 101 and 105 illustrated and discussed above with reference to FIG. 1. Thus, in some embodiments, network device 310 may comprise a processor, memory, and a plurality of transmitting modules, and network device 320 may comprise a processor, memory, and a plurality of transmitting modules cooperatively operating to implement functions in accordance with the present disclosure. Network device 310 may be configured to establish a communication link 330 with network device 320.

In some embodiments, phase synchronization may aim to recover n angles $\theta_1, \ldots, \theta_n$ in $[-\pi, \pi)$ using noisy measurements of their differences $\{\theta_i - \theta_j\}_{i \neq j}$ mod $2\pi$. This may be equivalent to estimating n unimodular variables $e^{j\theta_1}, \ldots, e^{j\theta_n}$ from the relative measurements $\{e^{j(\theta_i - \theta_j)}\}_{i \neq j}$. In aspects, this phase synchronization problem may arise from clock synchronization of distributed networks and signal reconstruction from phaseless measurements. In embodiments, the unimodular variables $\{x_i = e^{j\theta_i}\}_{i=1}^n$ may be defined. Then, it may be noted that $e^{j(\theta_i - \theta_j)} = x_i x_j^*$. In this case, if the relative phase difference between the ith and jth phases is stored in the (i,j) entry of a Hermitian matrix of C, then the following formulation may be obtained:

$$C = xx^H + \Delta \quad (11)$$

where Δ represents a Hermitian error. When the entries of Δ are white Gaussian, the ML estimate of the vector x may be given by the following formulation:

$$\min_{x \in \mathbb{C}^n} \|C - xx^H\|_F^2, \text{ s.t. } |x_i|^2 = 1, i = 1, \ldots, n \quad (12)$$

Because $\|C-xx^H\|_F^2 = \|C\|_F^2 + \|xx^H\|_F^2 - 2x^H C x$ and because $\|xx^H\|_F^2 = n^2$, equation (12) may be reformulated as:

$$\min_{x \in \mathbb{C}^n} x^H(-C)x, \text{ s.t. } |x_i|^2 = 1, i = 1, \ldots, n \quad (13)$$

which is a formulation of the UMQP problem expression. Since in this case −C is not positive semidefinite, this phase synchronization problem may not be transformed into a UMLS problem expression. Nonetheless, the inventive CD approaches of embodiments of the present disclosure provide rules sets that, when implemented in a system, such as system 300, may provide a solution to the phase synchronization problem expressed as a UMQP problem expression in equation (13).

The foregoing exemplary problem scenarios in which embodiments of the present disclosure may be implemented to provide a solution are described herein to aid in the understanding of the concepts of the present invention and are not intended as a limitation on the scope or applicability of those concepts or the invention herein. Accordingly, embodiments consistent with the concepts herein, although implementing various alterations with respect to the examples described above, are nevertheless included within the scope of the present invention. For example, although example embodiments of rule sets for implementing solutions to the UMLS/UMQP problem expression are shown with reference to MIMO detection, source localization, and phase synchronization applications, it should be appreciated that embodiments may be implemented for any technological application in which technical implementation problems may be formulated as a UMLS/UMQP problem expression.

Furthermore, to aid in the understanding of the concepts of the present invention, the discussion that now follows describes a generalized formulation of UMLS/UMQP problem expressions, and also describes in detail the deficiencies of current approaches to solve the UMLS/UMQP problem.

Generalized Formulation of the UMLS/UMQP Problem Expression and Current Approaches As noted above, implementations of many technological applications may include tasks, activities, or steps that may be generalized, and formulated, as UMLS/UMQP problem expressions. Solving these UMLS/UMQP problem expressions may involve solving a generalized UMLS/UMQP problem. In general terms, a solution to a UMLS/UMQP problem may involve optimizing a multivariate least squares or quadratic function subject to the constraint that all variables have unit magnitudes.

With respect to the generalized UMLS problem, the UMLS problem may be characterized as finding a signal vector by minimizing a least squares cost function, subject to the constraint that all elements of the signal vector have unit magnitudes. For example, a generalized formulation of the UMLS problem may be expressed as follows:

$$\min_{x \in \mathbb{C}^n} f(x) := \|Ax - b\|^2, \text{ s.t. } |x_i|^2 = 1, i = 1, \ldots, n \quad (14)$$

where x is the signal vector, n is the number of elements in the signal vector x, $x_i$ is the ith element of x, A is a given multiplication matrix, b is a given observation vector, $b \in \mathbb{C}^m$, and $A \in \mathbb{C}^{m \times n}$. In these implementations, a goal may be to find the vector $x \in \mathbb{C}^n$, given A and b, which may imply a solution to the UMLS problem formulated in equation (14). In general terms, b=Ax may indicate a general system of linear equations. As the length of b is m, there may be m equations in b=Ax. A may contain coefficients of the unknowns in x for each equation. For example, in a particular example, when m=3, and $x=[x_1, x_2]^T$, b=Ax may be represented by:

$$b_1 = A_{1,1}x_1 + A_{1,2}x_2$$

$$b_2 = A_{2,1}x_1 + A_{2,2}x_2$$

$$b_3 = A_{3,1}x_1 + A_{3,2}x_2$$

In this example, a goal may be to find $x_1$ and $x_2$ which best align with b=Ax based on least squares, subject to the magnitudes of $x_1$ and $x_2$ being 1.

With respect to the generalized UMQP problem, the UMQP problem may be expressed as optimizing a multivariate quadratic function subject to the constraint that all elements have unit magnitudes. However, the UMQP problem may be considered as a generalization of the UMLS problem. For example, the UMQP problem may be formulated as follows:

$$\min_{x \in \mathbb{C}^n} q(x) := x^H C x + 2\text{Re}(v^H x), \text{ s.t. } |x_i|^2 = 1, i = 1, \ldots, n \quad (15)$$

where $C \in \mathbb{C}^{n \times n}$ may be a Hermitian matrix, and $v \in \mathbb{C}^n$ may correspond to a vector of the linear term in the UMQP formulation (e.g., in a particular implementation of phase synchronization as discussed above). It should also be noted that for real-valued signal vectors, e.g., $x \in \{-1, +1\}^n$, the UMLS and UMQP formulations may be reduced to the Boolean least squares and Boolean quadratic program, respectively. It should further be noted that in some specific applications, e.g., phase synchronization, v may be zero.

A main difficulty in solving the UMLS problem in equation (14) may be that the unit-modulus constraints to which the problem is subject to, namely $\{|x_i|^2 = 1\}_{i=1}^n$, is a nonconvex constraint, and thus, the formulation of the UMLS problem may be considered a nonconvex problem. In fact, the UMLS problem may be considered a nonconvex quadratically constrained quadratic program (QCQP). Additionally, the UMLS problem is NP-hard in general. This nonconvex and NP-hard properties of the UMLS problem presents a significant challenge in implementing technical features of a system in which UMLS problems may arise.

As further noted above, one solution that has been proposed to address the difficulty presented by the nonconvexity of the UMLS problem is the SDR approach. In the SDR approach, the nonconvex constraint may be relaxed to the following convex formulation:

$$\min_{x \in \mathbb{C}^n, X \in \mathbb{C}^{n \times n}} \|Ax - b\|^2, \text{ s.t. } X \succeq xx^H, X_{ii} = 1, i = 1, \ldots, n \quad (16)$$

where $X \succeq xx^H$ denotes that $X - xx^H$ is positive semidefinite, and $X_{ii}$ denotes the (i, i) entry of X. This is a convex optimization because the objective is a convex function while the constraints are convex in terms of X and x, and the optimization may be solved by an interior-point method. However, equation (16) lifts the original vector $x \in \mathbb{C}^n$ into a matrix $X \in \mathbb{C}^{n \times n}$. As such, the number of optimization variables may be increased from n to $n^2$, which results in a computational complexity of $\mathcal{O}(n^7)$ per iteration. Considering the storage requirement of $n^2$ variables, the SDR approach becomes impractical and costly. This is especially true when n is large, e.g., in applications of large-scale MIMO detection and phase-only beamforming with massive antennas.

As also discussed above, a more recent solution that has been proposed to address the difficulty presented by the nonconvexity of the UMLS problem is the GP approach. The GP approach, which is a first-order method, seeks to reduce the computational and memory resources required by the generalized formulation in equation (14) by keeping the unit-modulus constraint and using projected gradient descent. In the GP approach, at each iteration, the solution is updated along the negative gradient direction, and the result is then projected back to the constraint set to ensure that all the iterates satisfy the unit-modulus requirement. For example, at the kth iteration, the GP approach updates the estimate of the signal vector x in accordance with the following:

$$x^{k+1} = \Pi_S(x^k - \alpha_k \nabla f(x^k)) \quad (17)$$

where $\nabla f(x) = A^H(Ax - b)$ denotes the gradient of $f(x)$, $\alpha_k > 0$ is the step size, and $\Pi_S(\ )$ denotes the projection onto the unit-modulus constraint set $S = \{x \| x_i \|^2 = 1, i = 1, \ldots, n\}$. In this approach, for any vector $z \in \mathbb{C}^n$, the computation of the projection $\Pi_S(z)$ may be simplified as it merely requires the normalization of the modulus of each element, which is given by:

$$[\Pi_S(z)]_i = \begin{cases} z_i / |z_i|, & \text{if } z_i \neq 0 \\ e^{j\theta}, & \text{if } z_i = 0 \end{cases} \quad (18)$$

where $[\Pi_S(z)]_i$ denotes the ith entry of $\Pi_S(z)$ and $\theta$ is an arbitrary angle in $[-\pi, \pi)$.

In comparison to SDR, GP results in a smaller computational complexity of $\mathcal{O}(mn)$ per iteration. However, the convergence rate of the GP approach is slow, which results in a large number of iterations to attain a satisfactory accuracy. As such, systems that employ the current approaches for solving the UMLS/UMQP problem expression have clear deficiencies due to the high complexity requirements and low performance due to slow convergence rates. As will now be discussed in the description that follows, technological systems implemented in accordance with the present disclosure address the deficiencies of the current approaches. For example, technological systems implemented in accordance with the present disclosure provide solutions to technical implementation problems that may be expressed as UMLS/UMQP problem expressions by providing means by which the UMLS/UMQP problem expressions may be solved. Therefore, systems implemented in accordance with the present disclosure include improved functionality. Additionally, the present disclosure provides rule sets that, when implemented, provide a superior solution to the UMLS/UMQP problem expressions over current solutions. Therefore, systems implemented in accordance with the present disclosure include technical improvements in computer resource utilization, speed, accuracy, and performance, over existing solutions.

Coordinate Descent Techniques for UMLS/UMQP Problem Expression

The discussion that follows describes a novel approach that implements an iterative CD algorithmic framework to solve UMLS/UMQP problem expressions that may be utilized to solve problems in many technical applications. As has been noted above, the CD approach of embodiments in accordance with aspects of the present invention addresses the UMLS/UMQP problem expression in a more computationally efficient, easy-to-implement, and scalable manner than current approaches. As such, it will be appreciated that systems implemented in accordance with the present disclosure provide improved functionality. Furthermore, according to embodiments of the present disclosure, the CD approach involves an iterative procedure that successively minimizes the objective function $f(x)$ along coordinate directions. More specifically, the CD approach of embodiments monotonically decreases the objective function $f(x)$, which is lower bounded by $f(x^k) \geq 0$. Hence, the present disclosure provides rule sets that, when implemented, cause the objective function $f(x)$ to converge to a convergence point. In some embodiments, the convergence point may be KKT point to which the objective function converges from any initial value. In aspects, several CD processes are disclosed, directed to different specific implementations of the generalized CD approach.

According to one embodiment of the present disclosure, a non-greedy CD (NGCD) rule set to implement a process to address the UMLS problem expression is disclosed. As used herein, a greedy approach to the UMLS/UMQP problem expression may refer to a scheme that may use gradient information together with constraint information in solving the UMLS/UMQP problem. A non-greedy approach to the UMLS/UMQP problem expression may refer to a scheme that may not use gradient information together with constraint information in solving the UMLS/UMQP problem.

Figure 4:
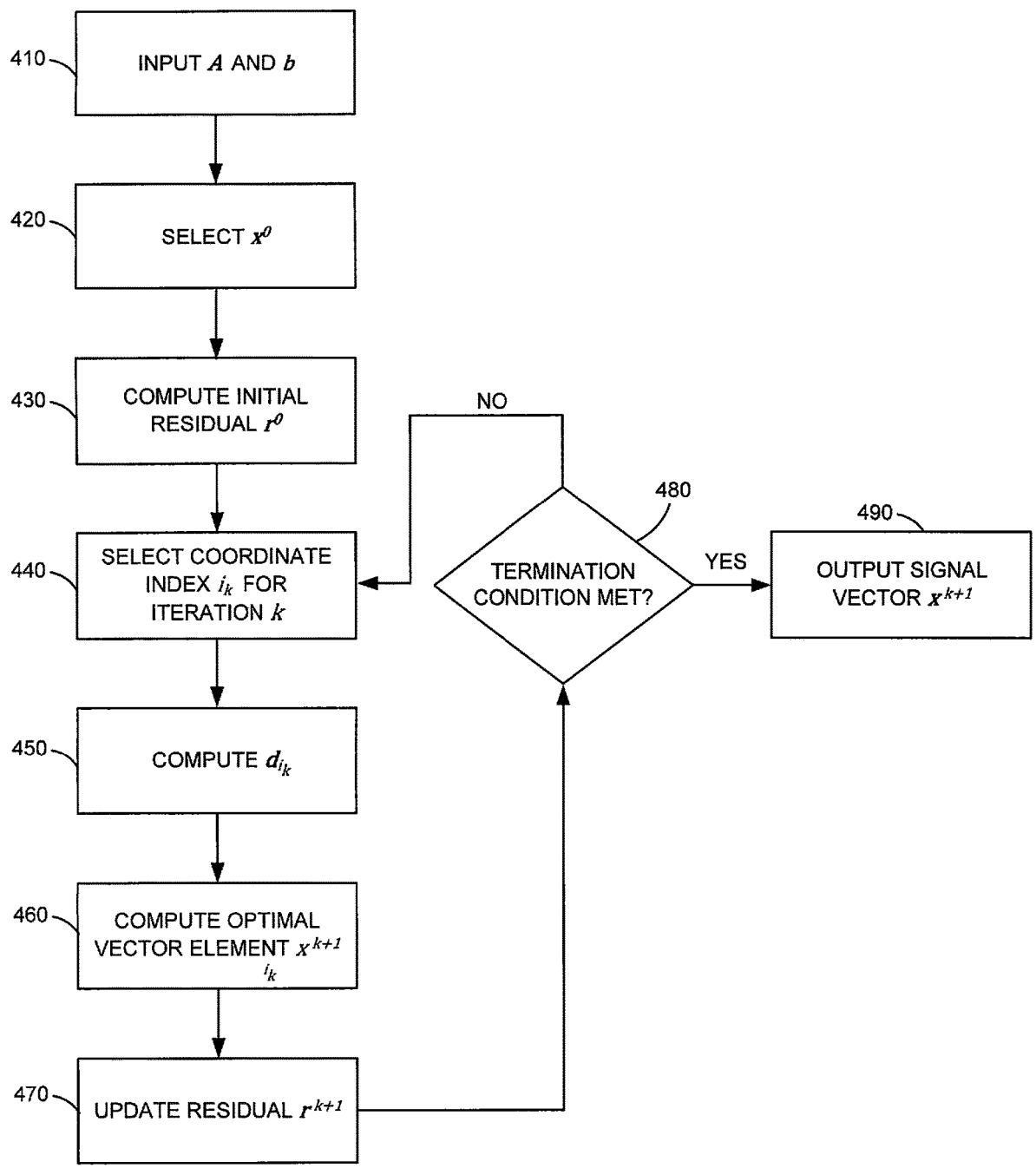
FIG. 4 shows a functional block diagram illustrating example blocks executed to implement aspects of the present disclosure.

FIG. 4 shows a functional block diagram illustrating example blocks executed to implement the non-greedy rule set of the present disclosure. In embodiments, each block illustrated in FIG. 4 may comprise a rule in the rule set. In some aspects, the blocks illustrated in FIG. 4 may be implemented as computer software, electronic hardware, or combinations of both, and may include instructions executable in hardware, such as processor 106 of network device 105, the MLD detector described above, etc., to perform the tasks and functions implementing the rules described herein. It is noted that the NGCD process of embodiments monotonically decreases an objective function associated with the UMLS/UMQP problem expression until the function converges to a convergence point. The convergence point may then be outputted as the solution to the UMLS/UMQP problem expression. It is noted that in some cases, the convergence point may be considered a stationary point of the constrained optimization problem.

At block 410, under the NGCD process implemented in accordance to the provided rule set, matrix A and vector b may be given as inputs. At block 420, an initial value for the signal vector $x^k$, for k=0, is selected. For example, the rule set may specify $x^0 = 0$ or may specify the unconstrained least squares solution $x^0 = A^\dagger b$ as the initial value for x. It is noted that, in some embodiments, as discussed in more detail below, the objective function $f(x)$ may converge to a KKT point from any initial value. Thus, in some implementations, the initial value selected during initialization may not be relevant to the convergence limit point.

In embodiments, the NGCD process may continue to block 430. At block 430, an initial residual $r^0$ is computed in accordance with the formulation $r^0 = Ax^0 - b$, where matrix A and vector b are given as initial inputs, and $x^0$ is the initial value for x computed during initialization. In embodiments, the NGCD process may then specify iterations through k=0, 1, . . . until a termination condition is satisfied.

At block 440 of the NGCD process, a coordinate index $i_k$ is selected for the current iteration k. It is noted that the NGCD process may consider that, in some embodiments, signal vector x may be expressed as $x = [x_1, \ldots, x_n]^T$. Therefore, the objective function $f(x)$ in the generalized formulation of UMLS in equation (14) may be expressed as $f(x_1, \ldots, x_n)$. Furthermore, for each iteration k, the resultant signal vector of the kth iteration may be denoted as $x^k = [x_1^k, \ldots, x_n^k]^T$. Thus, according to embodiments, at the kth iteration, the objective function $f(x_1, \ldots, x_n)$ may be minimized with respect to the selected coordinate index $i_k$, where $i_k \in \{1, \ldots, n\}$, while the remaining n−1 vector elements of the signal vector $x^k$, e.g., vector elements $\{x_i^k\}_{i \neq i_k}$, may remain fixed. This may allow the minimization of $f(x_1, \ldots, x_n)$ in accordance with the foregoing to be expressed as follows:

$$x_{i_k}^{k+1} = \arg \min_{|x_{i_k}|=1} f(x_1^k, \ldots, x_{i_k-1}^k, x_{i_k}, x_{i_k+1}^k, \ldots, x_n^k) \quad (19)$$

According to embodiments of the present disclosure, several approaches for selecting coordinate index $i_k$ may be provided. For example, in some aspects, the NGCD process may provide a rule for selecting, for each kth iteration, a coordinate index $i_k$. In embodiments of the present disclosure, selecting the coordinate index $i_k$ may be performed using a particular rule. For example, selecting the coordinate index $i_k$ may be performed using one of the three following rules:

Cyclic CD (CCD): The coordinate index $i_k$ may be specified sequentially and cyclically. For example, at a first iteration k, the coordinate index $i_k$ may be selected to be 1, at a second iteration k+1, the coordinate index $i_{k+1}$ may be selected to be 2, and so forth until a coordinate index for a particular iteration may be selected to be n. The selected values for the coordinate index may then be repeated starting with $i_k=1$ again. Thus, coordinate index $i_k$ may take values cyclically from $\{1, \ldots, n\}$, and one cycle may correspond to n iterations.

Random CD (RCD): The value of coordinate index $i_k$ for each iteration may be randomly selected from $\{1, \ldots, n\}$ with equal probability for each value in the set for each iteration.

Randomly permuted CD (RPCD): This rule may be considered a combination of the CCD rule and the RCD rule. Under RPCD, at each cycle, the order of the values selected for coordinate index $i_k$ may be non-sequential, e.g., from 1 to n, but instead may be random permutations of $\{1, \ldots, n\}$. Therefore, under RPCD, every coordinate value in the set $\{1, \ldots, n\}$ may be selected at each cycle for coordinate index $i_k$, but the order of the selected values at each cycle may be randomly permuted.

The NGCD process may continue to block 450. At block 450, a vector $d_{i_k}$ is computed based on the residual $r^k$. According to embodiments, for fixed n−1 vector elements $\{x_i^k\}_{i \neq i_k}$, the objective function of equation (19) may be a univariate quadratic function of vector element $x_{i_k}$ that may be formulated as follows:

$$\tilde{f}(x_{i_k}) = \|x_{i_k} a_{i_k} - d_{i_k}\|^2 \quad (20)$$

where $a_{i_k}$ is the $i_k$th column of given matrix A, and $d_{i_k} = b - \sum_{j \neq i_k} x_j^k a_j$. If the residual at the kth iteration is denoted as $r^k = Ax^k - b$, then the corresponding value of the objective function may be expressed as $f(x^k) = \|r^k\|^2$. As such, $d_{i_k}$ may be expressed in terms of $a_{i_k}$ and $r^k$ as follows:

$$d_{i_k} = b - \sum_{j=1}^n x_j^k a_j + x_{i_k}^k a_{i_k} = b - Ax^k + x_{i_k}^k a_{i_k} = x_{i_k}^k a_{i_k} - r^k \quad (21)$$

At block 460, the optimal solution for vector element $x_{i_k}^{k+1}$ at the kth iteration is computed. In embodiments, dropping the subscripts in equation (20) for notational simplicity may result in the following equivalent scalar minimization problem:

$$\min_{x \in \mathbb{C}} \tilde{f}(x) := \|xa - d\|^2, \text{ s.t. } |x|^2 = 1 \quad (22)$$

The univariate objective function in equation (22) may be expanded as follows:

$$\tilde{f}(x) = |x|^2 \|a\|^2 - 2\mathrm{Re}(x^* a^H d) + \|d\|^2 \quad (23)$$

Since any feasible solution fulfills the unit-modulus constraint $|x|^2 = 1$ in equation (22), the term $|x|^2 \|a\|^2$ in equation (23) may be expressed as a constant $\|a\|^2$. As such, equation (22) may be expressed as a maximization problem of the real part of a complex number, subject to a unit-modulus constraint. This maximization problem may be expressed as $$\max_{x \in \mathbb{C}} \mathrm{Re}(x^* a^H d), \text{ s.t. } |x| = 1.$$

It should be understood that, in general, the real part of a complex number is not larger than its modulus. Therefore, $\mathrm{Re}(x^* a^H d) \leq |x^* a^H d| = |x| |a^H d| = |a^H d|$. Furthermore, it is noted that $\mathrm{Re}(x^* a^H d)$ may attain a maximum value when $x^* a^H d$ is a real positive number or when the phase angle of x is the same as that of $a^H d$. In light of this, and considering that $|x| = 1$, x may be expressed in exponential form of a complex number, with $a^H d$ as the angle of the complex number. Thus, $x = e^{j \angle (a^H d)}$. As such, the optimal solution for vector element $x_{i_k}^{k+1}$, originally formulated in (19), may be expressed in exponential form of a complex number as follows:

$$x_{i_k}^{k+1} = e^{j \angle (a_{i_k}^H d_{i_k})} \quad (24)$$

It will be appreciated that as $d_{i_k}$ is constructed from the given vector b and the $i_k$th column of given matrix A, then the optimal solution for primal element $x_{i_k}^{k+1}$ based on the univariate quadratic function in equation (20) may be obtained based on the given matrix A and given vector b.

At block 470, and continuing at iteration k, the residual of the objective function with respect to the next iteration k+1, $r^{k+1}$, is computed. In aspects, equations (23) and (24) may be combined to obtain the objective function at the (k+1)th iteration. Therefore, the objective function at the (k+1)th iteration may be expressed as:

$$f(x^{k+1}) = \tilde{f}(x_{i_k}^{k+1}) = \|a_{i_k}\|^2 - 2|a_{i_k}^H d_{i_k}| + \|d_{i_k}\|^2. \quad (25)$$

Because the n−1 vector elements $\{x_i^k\}_{i \neq i_k}$ remained fixed, only the $i_k$th element of the solution has been changed at the kth iteration. As such, it follows that $x^{k+1} = x^k + (x_{i_k}^{k+1} - x_{i_k}^k) e_{i_k}$, where $e_{i_k}$ is the unit vector with the $i_k$th entry being one and all other entries being zero. Thus, the residual $r^{k+1}$ may be updated in accordance with the following formulation:

$$r^{k+1} = Ax^{k+1} - b = Ax^k - b + (x_{i_k}^{k+1} - x_{i_k}^k) A e_{i_k} = r^k - (x_{i_k}^{k+1} - x_{i_k}^k) a_{i_k} \quad (26)$$

As will be appreciated, based on the equation (26), for each iteration, the residual may be updated efficiently by a mere computation of a scalar-vector multiplication $(x_{i_k}^{k+1} - x_{i_k}^k) a_{i_k}$, which may not have high computational requirements. As such, the successive iterations of the NGCD process may be performed without high computation costs.

In embodiments, the NGCD process may continue to iterate through $k = 0, 1, \ldots$ until a termination condition is encountered. Thus, at block 480, the NGCD process determines if a termination condition has been met. In aspects, there may be various conditions for terminating the NGCD process. For example, the reduction of the objective function $f(x)$ may be used to check for convergence. In a specific implementation, the NGCD process may be terminated when $\|r^k\|^2 - \|r^{k+1}\|^2 < TOL$ holds, where $TOL > 0$ is a small tolerance parameter. In some aspects, TOL may be predetermined and may be a particular value from 0. For example, TOL may be a value between 0 and $10^{-5}$. It should be noted that, as the NGCD process monotonically decreases the objective function $f(x)$, this implies that $\|r^k\|^2 - \|r^{k+1}\|^2 > 0$.

If at block 480 the NGCD process determines that a termination condition has not been met, the NGCD process continues iterating through k and continues operations back to block 440, where a coordinate index with respect to the next iteration may be selected.

If at block 480 the NGCD process determines that a termination condition has been met, the NGCD process operations stop iterating through k and continue at block 490, where the signal vector with respect to the next iteration $x^{k+1}$ is outputted. It should be appreciated that as the NGCD process monotonically decreases the objective function $f(x)$, after a termination condition, which may indicate a convergence to a convergence point, $x^{k+1}$ may have the converged point value and thus, may be a solution to the UMLS problem expression.

It is noted that the complexity of the three CD coordinate index selection rules discussed above, namely the CCD, RCD, and RPCD, has been found to be $\mathcal{O}(m)$ per iteration. Therefore, the complexity of a cycle for CCD or RPCD, which may be n iterations, may be $\mathcal{O}(mn)$. It is also noted that, as discussed above, current full gradient methods, such as GP and accelerated GP (AGP) also have a complexity of $\mathcal{O}(mn)$.

The NGCD process discussed above is further exemplified below by the pseudo code shown in Table 1.

TABLE 1

Figure 5:
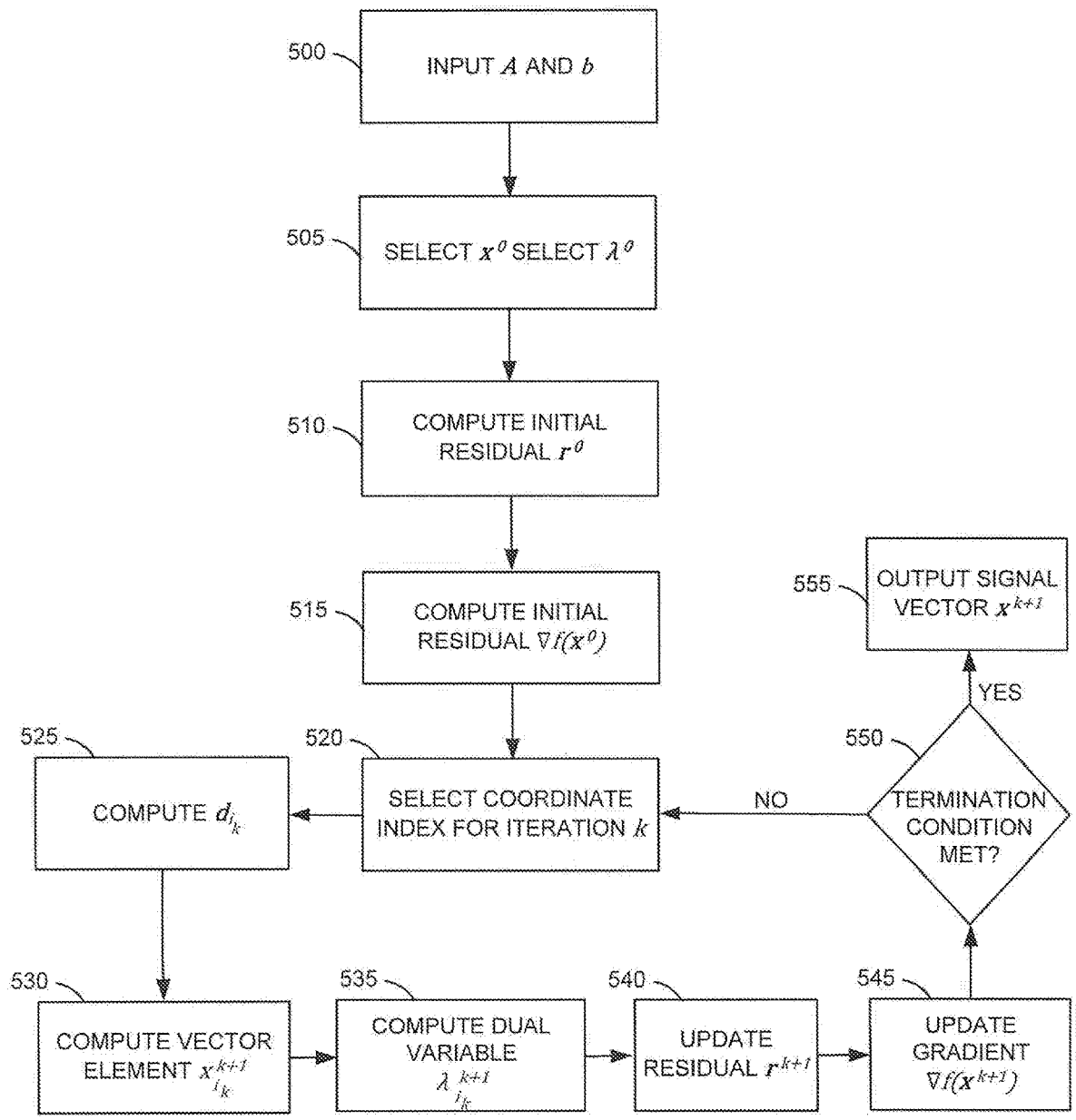
FIG. 5 shows another functional block diagram illustrating example blocks executed to implement aspects of the present disclosure.

Input: $A \in \mathbb{C}^{m \times n}$ and $b \in \mathbb{C}^m$
  Initialization: Choose $x^0 \in \mathbb{C}^n$.
  Compute residual $r^0 = Ax^0 - b$.
  for $k = 0, 1, \ldots$, do
    Choose index $i_k \in \{1, \ldots, n\}$;
    $d_{i_k} = x_{i_k}^k a_{i_k} - r^k$;
    $x_{i_k}^{k+1} = cj \angle (a_{i_k}^{11} d_{i_k})$;
    Update residual $r^{k+1} = r^k + (x_{i_k}^{k+1} - x_{i_k}^k) a_{i_k}$
    Stop if termination condition is satisfied.
  end for TABLE 1-continued Output: $x^{k+1}$ According to another embodiment of the present disclosure, a greedy CD (GCD) rule set to implement a process to address the UMLS problem expression is disclosed. FIG. 5 shows a functional block diagram illustrating example blocks executed to implement the GCD aspect of the present disclosure. In embodiments, each block illustrated in FIG. 5 may comprise a rule in the rule set. In some aspects, the blocks illustrated in FIG. 5 may be implemented as computer software, electronic hardware, or combinations of both, and may include instructions executable in hardware, such as processor 106 of network device 105, the MLD detector described above, etc., to perform the tasks and functions implementing the rules described herein.

As noted above, the GCD process monotonically decreases the objective function $f(x)$ until the function converges to a limit point. The converged limit point is then outputted as the solution to the UMLS problem expression. The GCD process may have similarities to the NGCD process, but, in some embodiments, may include distinct rules. In particular, the GCD process may choose the coordinate with the largest absolute value of the partial derivative. Therefore, in comparison with the NGCD process, the GCD process may attain a faster convergence rate, although full gradient computation may be required at each iteration. The GCD, thus, may also include rules for computing and updating a gradient of the objective function $f(x)$, and for selecting and updating both primal and dual variables.

At block 500, under the GCD process implemented in accordance to the provided rule set, matrix A and vector b may be given as inputs. At block 505, an initial value for the signal vector $x^k$, for $k = 0$, is selected. For example, the rule set may specify $x^0 = 0$ or may specify the unconstrained least squares solution $x^0 = A^\dagger b$ as the initial value for x. It is noted that, in some embodiments, as discussed in more detail below, the objective function $f(x)$ may converge to a KKT point from any initial value. Thus, in some implementations, the initial value selected during initialization may not be relevant to the convergence limit point.

As noted above, and as will be discussed in more detail below, the GCD process may also, at each kth iteration, consider the dual variables vector $\lambda^k$. Thus, at block 505, the GCD process of embodiments may also specify an initial value for the dual variables vector $\lambda^k$, for $k = 0$. For example, in some implementations, an initial value of 0 may be selected for dual variables vector $\lambda^k$, for $k = 0$.

At block 510, an initial residual $r^0$ is computed in accordance with the formulation $r^0 = Ax^0 - b$, where matrix A and vector b are the given as inputs, and $x^0$ is the initial value for x computed during initialization. At block 515, the GCD process may also specify a rule to compute an initial gradient of the objective function for the initial value of the signal vector $\nabla f(x^0)$, in accordance with the formulation $\nabla f(x^0) = A^H r^0$, where matrix A is the given input, and $r^0$ is computed during initialization as discussed above. In embodiments, the GCD process may then specify iterations through $k = 0, 1, \ldots$ until a termination condition is satisfied.

At block 520, a coordinate index $i_k$ is selected for the current iteration k. It is noted that, as discussed above, the minimization of the objective function $f(x_1, \ldots x_n)$ may be expressed as in equation (19) above. It is also noted that, generally, in a greedy scheme (e.g., a scheme that does not consider the unit-modulus constraint), the standard way to compute the coordinate index $i_k$ may include finding, and selecting, a coordinate index at which the absolute value of a partial derivative of the objective function of the signal vector with respect to the coordinate index is maximized. This computation may be formulated as follows:

$$i_k = \arg \max_i |\nabla f_i(x^k)|, \; \nabla f_i(x) = \frac{\partial f(x)}{\partial x_i^*} \quad (27)$$

However, equation (27) is merely applicable to unconstrained optimization, a different formulation may be used to derive the GCD for the constrained problem in equation (27). In some embodiments, to take into account the unit-modulus constraint of the UMLS problem expression, both primal and dual variables may be needed. Thus, based on the formulation of the UMLS problem expression in equation (14), the Lagrangian of equation (14) may be constructed and expressed as follows:

$$\mathcal{L}(x,\lambda) = f(x) + \Sigma_{i=1}^n \lambda_i(|x_i|^2 - 1) \quad (28)$$

where the Lagrange vector $\lambda = [\lambda_1, \ldots \lambda_n]^T \in \mathbb{R}^n$ contains the Lagrange multipliers, or dual variables.

At the kth iteration, the GCD process considers not only the vector element $x^k$ but also the dual variables vector $\lambda^k$. Thus, under the GCD process, the following gradient vector may be considered:

$$\nabla_x \mathcal{L}(x^k, \lambda^k) = \frac{\partial \mathcal{L}}{\partial x^*}\bigg|_{x=x^k} = \nabla f(x^k) + \lambda^k \odot x^k \quad (29)$$

In light of this, at block 520, coordinate index $i_k$ may be selected as the coordinate index if the $i_k$th entry of $\nabla_x \mathcal{L}(x^k, \lambda^k)$ has the maximum modulus, or $|[\nabla_x \mathcal{L}(x^k, \lambda^k)]_{i_k}| = \|\nabla_x \mathcal{L}(x^k, \lambda^k)\|_\infty$. Therefore, this GCD coordinate index selection rule, that may be applicable at step 520, may be expressed as follows:

$$i_k = \arg \max_i |\nabla f_i(x^k) + \lambda_i^k x_i^k| \quad (30)$$

At block 525, a vector $d_{i_k}$ is computed based on the residual $r^k$. The formulation of this rule at block 525 may be similar to the formulation of the rule in the NGCD process and may be expressed as in equation (29) shown above. Thus, vector $d_{i_k}$ in the GCD process may be computed in accordance with equation (29).

At block 530 of the GCD process, vector element $x_{i_k}^{k+1}$ may be computed based on an optimal solution in the kth iteration. The formulation of this rule at block 530 may be similar to the formulation of the rule in the NGCD process and may be expressed as in equation (24) shown above. Thus, the vector element $x_{i_k}^{k+1}$ in the GCD process may be updated in accordance with equation (24).

At block 535, the dual variable $\lambda_{i_k}^{k+1}$ with respect to the next iteration k+1 may be determined and updated. In embodiments, determining $\lambda^k = [\lambda_1^k, \ldots, \lambda_n^k]^T$ may include constructing the Lagrangian of formulation (22) above, as follows:

$$\tilde{\mathcal{L}}(x,\lambda) = |x|^2 \|a\|^2 - 2\text{Re}(x^* a^H d) + \lambda(|x|^2 - 1) \quad (31)$$

where $\lambda \in \mathbb{R}$ is the Lagrange multiplier. It is noted that $\lambda$ may be a real number because of the real-valued constraint $|x|^2 = 1$, even though x may be a complex variable. Thus, the optimal primal-dual variables $(x, \lambda)$ may satisfy the first-order optimal condition $$\frac{\partial \tilde{\mathcal{L}}(x,\lambda)}{\partial x^*} = (\|a\|^2 + \lambda)x - a^H d = 0,$$

which may yield the following formulation:

$$x = \frac{a^H d}{\|a\|^2 + \lambda} \quad (32)$$

It is also noted that the partial derivative for complex variables of equation (31) may refer to the Wirtinger calculus, which may be defined as follows:

$$\frac{\partial \tilde{\mathcal{L}}}{\partial x^*} \triangleq \frac{1}{2}\left(\frac{\partial \tilde{\mathcal{L}}}{\partial \text{Re}(x)} + j\frac{\partial \tilde{\mathcal{L}}}{\partial \text{Im}(x)}\right) \quad (33)$$

Therefore, considering equation (32) in light of the optimal solution for vector element $x_{i_k}^{k+1}$ in equation (24), it follows that $\|a\|^2 + \lambda = |a^H d|$. Accordingly, the dual variable vector $\lambda_{i_k}^{k+1}$ computed at block 535 may be expressed as follows:

$$\lambda_{i_k}^{k+1} = |a_{i_k}^H d_{i_k}| - \|a_{i_k}\|^2 \quad (34)$$

At block 540, and continuing at iteration k, the residual of the objective function with respect to the next iteration k+1, $r^{k+1}$, is computed. The formulation of this rule at block 540 may be similar to the formulation of the rule in the NGCD process and may be expressed as in equation (26). Thus, residual $r^{k+1}$ in the GCD process may be updated at block 540 in accordance with formulation (26).

At block 545, the GCD process may also provide rules for updating the gradient of the objective function with respect to the next iteration, namely $\nabla f(x^{k+1})$. In aspects, the gradient $\nabla f(x^{k+1})$ may be updated in accordance with the formulation $\nabla f(x^{k+1}) = \nabla f(x^k) + (x_{i_k}^{k+1} - x_{i_k}^k) A^H a_{i_k}$. In some aspects, matrix-vector product $A^H a_{i_k}$ may be pre-computed before the kth iteration of the GCD process. Therefore, the per-iteration complexity of the GCD process may be $\mathcal{O}(m)$. Thus, it should be appreciated that, a system implementing the GCD process may achieve a faster convergence rate than a system implementing CCD, RCD, or RPCD, while keeping the same per-iteration complexity.

In embodiments, the GCD process may continue to iterate through k=0, 1, . . . until a termination condition is encountered. Thus, at block 550, the GCD process determines if a termination condition has been met. In aspects, there may be various conditions for terminating the GCD process. For example, the reduction of the objective function $f(x)$ may be used to check for convergence. In a specific implementation, the GCD process may be terminated when $\|r^k\|^2 - \|r^{k+1}\|^2 < \text{TOL}$ holds, where TOL>0 is a small tolerance parameter. In some aspects, TOL may be predetermined and may be a particular value from 0. For example, TOL may be a value between 0 and $10^{-5}$. It should be noted that, as the GCD process monotonically decreases the objective function $f(x)$, this implies that $\|r^k\|^2 - \|r^{k+1}\|^2 > 0$.

If at block 550 the GCD process determines that a termination condition has not been met, the GCD process continues iterating through k and continues operations back to block 520, where a coordinate index with respect to the next iteration may again be selected. However, if at block 550 the GCD process determines that a termination condition has been met, the GCD process operations stop iterating through k and continue at block 555, where the signal vector with respect to the next iteration $x^{k+1}$ is outputted. It should be appreciated that as the GCD process monotonically decreases the objective function $f(x)$, after a termination condition, which may indicate a convergence to a convergence point, $x^{k+1}$ may have the converged point value and thus, may be a solution to the UMLS problem expression.

It should be noted that a property of the GCD process may be that the coordinate selected at the current iteration k may not be selected again in the next iteration k+1. In order to provide proof of this property of the GCD process, it is noted that if the following is proved, $$\nabla_{i_k} f(x^{k+1}) + \lambda_{i_k}^{k+1} x_{i_k}^{k+1} = 0 \quad (35)$$

then $|\nabla_{i_k} f(x^{k+1}) + \lambda_{i_k}^{k+1} x_{i_k}^{k+1}| = 0$, which is the smallest modulus. Thus, $i_k$ may not be selected in the next iteration.

Observing $\nabla_{i_k} f(x^{k+1})$ may be the $i_k$th element of the full gradient $\nabla f(x^{k+1}) = A^H r^{k+1}$, it is noted that $$\nabla_{i_k} f(x^{k+1}) = a_{i_k}^H r^{k+1} = a_{i_k}^H \left(r^k + \left(x_{i_k}^{k+1} - x_{i_k}^k\right) a_{i_k}\right) \quad (36)$$
$$= a_{i_k}^H \left(x_{i_k}^k a_{i_k} - d_{i_k} + \left(x_{i_k}^{k+1} - x_{i_k}^k\right) a_{i_k}\right)$$
$$= a_{i_k}^H d_{i_k} + x_{i_k}^{k+1} \|a_{i_k}\|^2$$

On the other hand, $$\lambda_{i_k}^{k+1} x_{i_k}^{k+1} = x_{i_k}^{k+1} \left| a_{i_k}^H d_{i_k} \right| - x_{i_k}^{k+1} \|a_{i_k}\|^2 \| \quad (37)$$
$$= \left| a_{i_k}^H d_{i_k} \right| e^{j \angle \left(a_{i_k}^H d_{i_k}\right)} - x_{i_k}^{k+1} \|a_{i_k}\|^2$$
$$= a_{i_k}^H d_{i_k} - x_{i_k}^{k+1} \|a_{i_k}\|^2$$

Adding equations (36) and (37) yields the formulation in equation (35) and thus, equation (35) is proven. Accordingly, the coordinate selected at the current iteration k may not be selected again in the next iteration k+1.

The GCD process discussed above is further exemplified below by the pseudo code shown in Table 2.

TABLE 2

Algorithm 2 Greedy CD for UMLS

Input: $A \in \mathbb{C}^{m \times n}$ and $b \in \mathbb{C}^m$.
Initialization: Choose $x^0 \in \mathbb{C}^n$ and $\lambda^0 \in \mathbb{R}^n$.
Compute residual $r^0 = Ax^0 - b$.
Compute gradient $\nabla f(x^0) = A^H r^0$.
for k = 0, 1, ..., do Choose index $i_k = \arg\max_i |\nabla_i f(x^k) + \lambda_i^k x_i^k|$;

$d_{i_k} = x_{i_k}^k a_{i_k} - r^k$;

TABLE 2-continued

Update primal $\lambda_{i_k}^{k+1} = e^{j \angle \left(a_{i_k}^H d_{i_k}\right)}$;

Update dual $\lambda_{i_k}^{k+1} = |a_{i_k}^H d_{i_k}| - \|a_{i_k}\|^2$;
    Update residual $r^{k+1} = r^k + (x_{i_k}^{k+1} - x_{i_k}^k) a_{i_k}$
    Update gradient $\nabla f(x^{k+1}) = \nabla f(x^k) + (x_{i_k}^{k+1} - x_{i_k}^k) A^H a_{i_k}$
    Stop if termination condition is satisfied.
end for
Output: $x^{k+1}$ In some embodiments, the CD approaches discussed above, namely the NGCD process and the GCD, may be extended to the UMQP problem as discussed now. It is noted that a general form of the UMQP may be expressed as follows:

$$\min_{x \in \mathbb{C}^n} q(x) := x^H C x + 2\mathrm{Re}(v^H x), \text{ s.t. } |x_i|^2 = 1, i = 1, \ldots, n \quad (38)$$

where $C \in \mathbb{C}^{n \times n}$ is a given Hermitian matrix and $v \in \mathbb{C}^n$ is a given vector. In embodiments, if matrix C is positive semi-definite, then matrix C may have the Cholesky decomposition $C = L^H L$. It is also noted that the formulation of the general UMQP problem in equation (38) may be expressed as the following UMLS problem expression:

$$\min_{x \in \mathbb{C}^n} \|Lx - w\|^2, \text{ s.t. } |x_i|^2 = 1, i = 1, \ldots, n \quad (39)$$

where $w \in \mathbb{C}^n$ satisfies $Lw = v$. When C has full rank, e.g., when C is positive definite, then L may be full rank and $w = L^{-1} v$ may be unique. When C is rank deficient, L may also be rank deficient and the linear system of equations $Lw = v$ may have infinite solutions. In this case, embodiments of the present disclosure may select a single solution e.g., $w = L^\dagger v$, and thus, the CD algorithms for UMLS discussed above may be applied to the UMQP formulation in equation (38), if C is positive semidefinite.

However, in some embodiments, C may not be not positive semidefinite. In these embodiments, the function $q(x)$ may not be represented by a square of the $l_2$-norm and thus, the UMQP problem may not be expressed as a UMLS problem expression. However, the disclosed CD processes discussed above may be extended in accordance with embodiments of the present disclosure to solve the UMQP problem with slight modifications as discussed below. For example, at the kth iteration where the $i_k$th variable is selected, the scalar minimization problem with respect to vector element $x_{i_k}$ may be expressed as follows:

$$\min_{|x_{i_k}|=1} |x_{i_k}|^2 c_{i_k i_k} + 2\mathrm{Re}\left(x_{i_k}^*(t_{i_k} + v_{i_k})\right) \quad (40)$$

where $t_{i_k} = \sum_{j \neq i_k} c_{i_k j} x_j^k$, and $c_{ij}$ is the (i, j) entry of the given matrix C.

Additionally, the vector element $x_{i_k}$ may be updated by the optimal solution of equation (40). Thus, the optimal vector element $x_{i_k}$ may be expressed in exponential form of a complex number, with $-(t_{i_k} + v_{i_k})$ as the angle of the complex number. Accordingly, the optimal vector element may be expressed as $$x_{i_k}^{k+1} = e^{j \angle -\left(t_{i_k} + v_{i_k}\right)}.$$

In embodiments, $t_{i_k}$ may be computed and updated in accordance with the following. Denoting the $i_k$th column of C as $c_{i_k}$, the $i_k$th row of C may be $c_{i_k}^H$ since C is Hermitian. Accordingly, $t_{i_k}$ may be expressed as $t_{i_k} = c_{i_k}^H x^k - x_{i_k}^k c_{i_k i_k}$. Furthermore, defining h=Cx, it follows that $h^k$=C$x^k$, and therefore, $c_{i_k}^H x^k$ may be the $i_k$th entry of $h^k$, which may be denoted by $h_{i_k}^k$. This yields the following:

$$t_{i_k} = h_{i_k}^k - x_{i_k}^k c_{i_k i_k} \quad (41)$$

Thus, the NGCD process and the GCD, may be extended to the UMQP problem based on the above modifications. The CD approach for UMQP is exemplified below in the pseudo code shown in Table 3. It should be appreciated that only the $i_k$th element of the solution has been changed at the kth iteration. Therefore, it is noted that h is efficiently updated by a mere computation of a scalar-vector multiplication $h^{k+1} = h^k + (x_{i_k}^{k+1} - x_{i_k}^k) c_{i_k}$, which may not have high computational requirements.

TABLE 3

Algorithm 3 CD for UMQP

Input: $C \in \mathbb{C}^{n \times n}$ and $v \in \mathbb{C}^n$
Initialization: Choose $x^0 \in \mathbb{C}^n$.
Compute $h^0 = Cx^0$.
for k = 0, 1, ... , do
  Choose index $i_k \in \{1, ..., n\}$;
  $t_{i_k} = h_{i_k}^k - x_{i_k}^k c_{i_k i_k}$;
  $x_{i_k}^{k+1} = cj\angle -(t_{i_k} + v_{i_k})$;
  Update $h^{k+1} = h^k + (x_{i_k}^{k+1} - x_{i_k}^k) c_{i_k}$
  Stop if termination condition is satisfied.
end for
Output: $x^{k+1}$ Convergence Analysis of the Novel CD Approaches It is noted that typical convergence analyses of CD is limited to unconstrained optimization or convex constraints. However, as discussed above, the unit-modulus constraint in the UMLS/UMQP problem expression is nonconvex. Therefore, the existing convergence analyses may not be applicable to the CD for UMLS/UMQP. As mentioned above, the CD algorithms monotonically decrease the objective function $f(x)$, which is lower bounded by $f(x^k) \geq 0$. Hence, the objective function $f(x)$ may converge to a limit point. In the discussion that follows, it is shown that the CD approaches discussed herein globally converge to a KKT point from any initial value. A point $(x, \lambda)$ is called a KKT point of the constrained optimization problem in equation (14) if it satisfies the following:

$$\nabla_x \mathcal{L}(x, \lambda) = \nabla f(x) + \lambda \odot x = 0$$

$$|x_i|^2 = 1, i = 1, \ldots, n \quad (42)$$

The GCD process may generate both primal and dual variables, e.g., a sequence $\{(x^k, \lambda^k)\}$. However, the CCD, RCD, and RPCD non-greedy processes may not explicitly generate the dual variables. Nonetheless, observing that the optimal dual variable in the GCD process at each iteration k may also satisfy the formulation in equation (32), it may be shown that the NGCD processes may implicitly generate a sequence of $\{(x^k, \lambda^k)\}$ containing the primal and dual variables. The following statement shows the convergence of the CD processes.

Statement 1: The sequence $\{(x^k, \lambda^{k+1})\}$ generated by the RCD and RPCD processes and the GCD process globally converges to a KKT point of the UMLS problem expression from an arbitrary initial value.

The following discussion describes a proof of Statement 1. It is appreciated that the CD processes compute, at each iteration, the vector element with respect to the next iteration as $$x_{i_k}^{k+1} = e^{j\angle(a_{i_k}^H d_{i_k})}.$$

Accordingly, the results at all iterations satisfy the unit-modulus constraint. Hence, the second equality of the KKT condition may be fulfilled for all iterates. Note that here, it is intended to prove that $\{(x^k, \lambda^{k+1})\}$ rather than $\{(x^k, \lambda^k)\}$ converges. This slight modification does not affect the convergence conclusion because $$\lim_{k \to \infty}(x^k, \lambda^{k+1}) = \lim_{k \to \infty}(x^k, \lambda^k).$$

Exploiting $d_{i_k} = x_{i_k}^k a_{i_k} - r^k$ of (36) and $|x_{i_k}^k|=1$, the proof may begin from equation (25):

$$f(x^{k+1}) = \|a_{i_k}\|^2 - 2|a_{i_k}^H d_{i_k}| + \|d_{i_k}\|^2 \quad (43)$$

$$= \|a_{i_k}\|^2 - 2|a_{i_k}^H d_{i_k}| + \|x_{i_k}^k a_{i_k} - r^k\|^2$$

$$= \|a_{i_k}\|^2 - 2|a_{i_k}^H d_{i_k}| + |x_{i_k}^k|^2 \|a_{i_k}\|^2 + \|r^k\|^2 - 2\mathrm{Re}((x_{i_k}^k)^* a_{i_k}^H r^k)$$

$$= 2\|a_{i_k}\|^2 - 2|a_{i_k}^H d_{i_k}| + \|r^k\|^2 - 2\mathrm{Re}((x_{i_k}^k)^* a_{i_k}^H r^k)$$

which yields:

$$f(x^{k+1}) - f(x^k) = 2(\|a_{i_k}\|^2 - |a_{i_k}^H d_{i_k}| - \mathrm{Re}((x_{i_k}^k)^* a_{i_k}^H r^k)) \quad (44)$$

where we have used $f(x^k) = \|r^k\|^2$. Again, employing $r^k = x_{i_k}^k a_{i_k} - d_{i_k}$ results in $$\mathrm{Re}((x_{i_k}^k)^* a_{i_k}^H r^k) = \mathrm{Re}(|x_{i_k}^k|^2 \|a_{i_k}\|^2 - (x_{i_k}^k)^* a_{i_k}^H d_{i_k}) \quad (45)$$

$$= \|a_{i_k}\|^2 - \mathrm{Re}((x_{i_k}^k)^* a_{i_k}^H d_{i_k})$$

and hence, $$f(x^{k+1}) - f(x^k) = 2(\mathrm{Re}((x_{i_k}^k)^* a_{i_k}^H d_{i_k}) - |a_{i_k}^H d_{i_k}|) \quad (46)$$

As $|x_{i_k}^k|=1$, it follows that $\mathrm{Re}((x_{i_k}^k)^* a_{i_k}^H d_{i_k}) \leq |(x_{i_k}^k)^* a_{i_k}^H d_{i_k}| = |a_{i_k}^H d_{i_k}|$, where the equality may occur only when $$x_{i_k}^{k+1} = e^{j\angle(a_{i_k}^H d_{i_k})}.$$

In fact, it is noted that $$x_{i_k}^{k+1} = e^{j\angle(a_{i_k}^H d_{i_k})} \text{ and } x_{i_k}^{k+1} \neq x_{i_k}^k,$$

unless the algorithm converges. Therefore, $f(x^{k+1}) - f(x^k) < 0$, which implies that the objective function $f(x)$ strictly decreases.

On the other hand, the partial derivative of the Lagrangian may be evaluated with respect to the $i_k$th component at $(x^k, \lambda^{k+1})$ in accordance with the following formulation:

$$[\nabla_x \mathcal{L}(x^k, \lambda^{k+1})]_{i_k} = [\nabla f(x^k) + \lambda^{k+1} \odot x^k]_{i_k} \quad (47)$$
$$= \nabla_{i_k} f(x^k) + \lambda_{i_k}^{k+1} x_{i_k}^k$$
$$= x_{i_k}^k \|a_{i_k}\|^2 - a_{i_k}^H d_{i_k} + (|a_{i_k}^H d_{i_k}| - \|a_{i_k}\|^2) x_{i_k}^k$$
$$= x_{i_k}^k |a_{i_k}^H d_{i_k}| - a_{i_k}^H d_{i_k}$$

where equation (34) has been used in the third equality. Taking squared modulus on both sides of equation (47) may lead to the following:

$$|[\nabla_x \mathcal{L}(x^k, \lambda^{k+1})]_{i_k}|^2 = 2|a_{i_k}^H d_{i_k}|^2 - 2|a_{i_k}^H d_{i_k}| \cdot \mathrm{Re}((x_{i_k}^k)^* a_{i_k}^H d_{i_k}) \quad (48)$$
$$= 2|a_{i_k}^H d_{i_k}|(|a_{i_k}^H d_{i_k}| - \mathrm{Re}((x_{i_k}^k)^* a_{i_k}^H d_{i_k}))$$

Combining equations (46) and (48) may yield the following formulation:

$$f(x^k) - f(x^{k+1}) = \frac{|[\nabla_x \mathcal{L}(x^k, \lambda^{k+1})]_{i_k}|^2}{|a_{i_k}^H d_{i_k}|} \quad (49)$$

By Cauchy-Schwarz and triangle inequalities, an upper bound of $$|a_{i_k}^H d_{i_k}|$$

is derived as follows:

$$|a_{i_k}^H d_{i_k}| \le \|a_{i_k}\| \|d_{i_k}\| \quad (50)$$
$$= \|a_{i_k}\| \|x_{i_k}^k a_{i_k} - r^k\|$$
$$\le \|a_{i_k}\| (\|a_{i_k}\| + \|r^k\|)$$
$$\le M_a(M_a + \|r^0\|) \stackrel{\Delta}{=} C_a$$

where $$M_a = \max_{1 \le i \le n} \{\|a_i\|\}$$

may be the maximum of the $l_2$-norms of the columns. Additionally, it should be noted that the objective function $f(x)$ monotonically decreases, which implies that $\|r^k\| \le \|r^0\|$. Furthermore, a lower bound on the progress made by each CD process iteration k may be obtained as:

$$f(x^k) - f(x^{k+1}) \ge \frac{1}{C_a} |[\nabla_x \mathcal{L}(x^k, \lambda^{k+1})]_{i_k}|^2 \quad (51)$$

For different rules of coordinate index selection, the right-hand side of equation (51) may differ. However, the RCD, RPCD, and GCD processes are discussed together in the following discussion.

For the RCD and RPCD processes, since the coordinate index $i_k$ may be a random variable, the objective function $f(x^{k+1})$ may also be random. Accordingly, the expected value of the objective function $f(x^{k+1})$ may be evaluated based on the coordinate index $i_k$ in accordance with the following:

$$\mathbb{E}[f(x^{k+1})] \le \mathbb{E}\left[f(x^k) - \frac{1}{C_a}|[\nabla_x \mathcal{L}(x^k, \lambda^{k+1})]_{i_k}|^2\right] \quad (52)$$
$$= f(x^k) - \frac{1}{C_a} \sum_{i=1}^n \frac{1}{n} |[\nabla_x \mathcal{L}(x^k, \lambda^{k+1})]_{i_k}|^2$$
$$= f(x^k) - \frac{1}{nC_a} \|\nabla_x \mathcal{L}(x^k, \lambda^{k+1})\|^2$$

where the facts that the coordinate index $i_k$ is uniformly sampled from $\{1, \ldots, n\}$ with equal probability of $1/n$, and that the objective function $f(x^k)$ in the previous iteration is already deterministic are employed. Then the RCD/RPCD processes may obtain a reduction on the objective function $f(x)$ in accordance with the following:

$$f(x^k) - \mathbb{E}[f(x^{j+1})] \ge \frac{1}{nC_a} \|\nabla_x \mathcal{L}(x^k, \lambda^{k+1})\|^2 \quad (53)$$

Setting $k=0, \ldots, j$ in equation (53), and summing over all inequalities yields the following:

$$\sum_{k=0}^j \|\nabla_x \mathcal{L}(x^k, \lambda^{k+1})\|^2 \le nC_a(f(x^0) - \mathbb{E}[f(x^{j+1})]) \quad (54)$$
$$\le nC_a f(x^0)$$

where $f(x^{j+1}) \ge 0$ may be applied. Taking the limit as $j \to \infty$ on (54) may result in a convergent series as follows:

$$\Sigma_{k=0}^\infty \|\nabla_x \mathcal{L}(x^k, \lambda^{k+1})\|^2 \le nC_a f(x^0) \quad (55)$$

It should be noted that if a series converges, then its terms approach zero. This may indicate that the sequence $(x^k, \lambda^{k+1})$, generated by the RCD/RPCD processes, converges to a KKT as shown in the following formulation:

$$\lim_{k \to \infty} \nabla_x \mathcal{L}(x^k, \lambda^{k+1}) = 0 \quad (56)$$

In embodiments, GCD may choose the index with the largest partial derivative in magnitude, which may lead to the following:

$$|[\nabla_x \mathcal{L}(x^k, \lambda^{k+1})]_{i_k}|^2 = \|\nabla_x \mathcal{L}(x^k, \lambda^{k+1})\|_\infty^2 \quad (57)$$
$$\ge \frac{1}{n} \|\nabla_x \mathcal{L}(x^k, \lambda^{k+1})\|^2$$

Substituting equation (57) into equation (51) may yield the following lower bound of the progress of one GCD iteration:

$$f(x^k) - f(x^{k+1}) \ge \frac{1}{nC_a} \|\nabla_x \mathcal{L}(x^k, \lambda^{k+1})\|^2 \quad (58)$$

The foregoing may indicate that one GCD iteration decreases the objective function with an amount of at least $$\frac{1}{nC_a}\|\nabla_x \mathcal{L}(x^k, \lambda^{k+1})\|^2.$$

Following similar steps as discussed above with respect to the RCD/RPCD processes, it may be shown that $\nabla_x \mathcal{L}(x^k, \lambda^{k+1})$ vanishes as $k \to \infty$ and thus, the sequence generated by the GCD converges to a KKT point.

It is noted that, as used herein, global convergence to a KKT point may mean that CD converges from an arbitrary initial value. Unlike local convergence, global convergence may not require the initial value to be near the KKT point.

Furthermore, the above discussion describes and shows the convergence of the RCD, RPCD and GCD processes. With respect to the CCD process, it has been observed from numerical simulations that the CCD process converges even faster than the RCD and RPCD processes. Therefore, it has been shown empirically that the CCD process may also converge to a KKT point.

Experimental Results

As noted above, the CD approaches in accordance with aspects of the present invention address the UMLS/UMQP problem in a more computationally efficient, easy-to-implement, and scalable manner than current approaches. Experimental results show that the inventive concepts herein outperform other systems in computational complexity and efficiency.

With respect to convergence behavior of the CCD, RCD, RPCD, and GCD processes disclosed herein, it is noted that the true signal x may be uniformly distributed in the unit circle. That is, $x_i = e^{j\phi_i}$, where $\phi_i$ satisfies a uniform distribution in $[-\pi, \pi]$. Each entry of the matrix A is a standard circular Gaussian distributed variable. After x and A are generated, the observation may be constructed as $b = Ax + v$, where v is the white Gaussian noise. The signal-to-noise ratio (SNR) may be defined as follows:

$$SNR = \frac{\mathbb{E}[\|Ax\|^2]}{m\sigma_v^2} \quad (60)$$

where $\sigma_v^2$ is the variance of v.

Initially, the process sets m=150 and n=100. The four CD processes disclosed herein, namely CCD, RCD, RPCD, and GCD, are compared with the GP and AGP. Note that it is fair to compare n iterations (one cycle) for the CD with one GP/AGP iteration because the theoretical complexity of the CD per cycle is the same as the GP/AGP per iteration. Two performance metrics may be employed to evaluate the convergence rate. The first may be the objective function normalized with respect to $\|b\|^2$, i.e., $\|r^k\|^2/\|b\|^2$. The second may be the relative estimation error:

$$\frac{\|x^k - x\|^2}{\|x\|^2} \quad (61)$$

which may reflect the convergence speed to the original signal.

Figure 6:
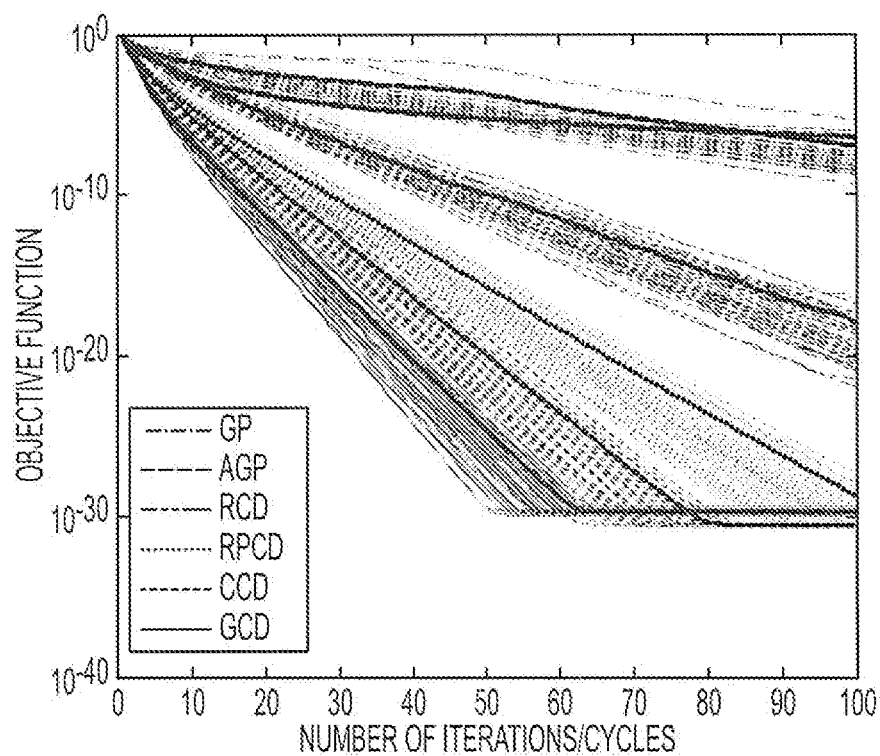
FIG. 6 shows a chart illustrating experimental results from a system implemented in accordance with aspects of the present disclosure.
Figure 7:
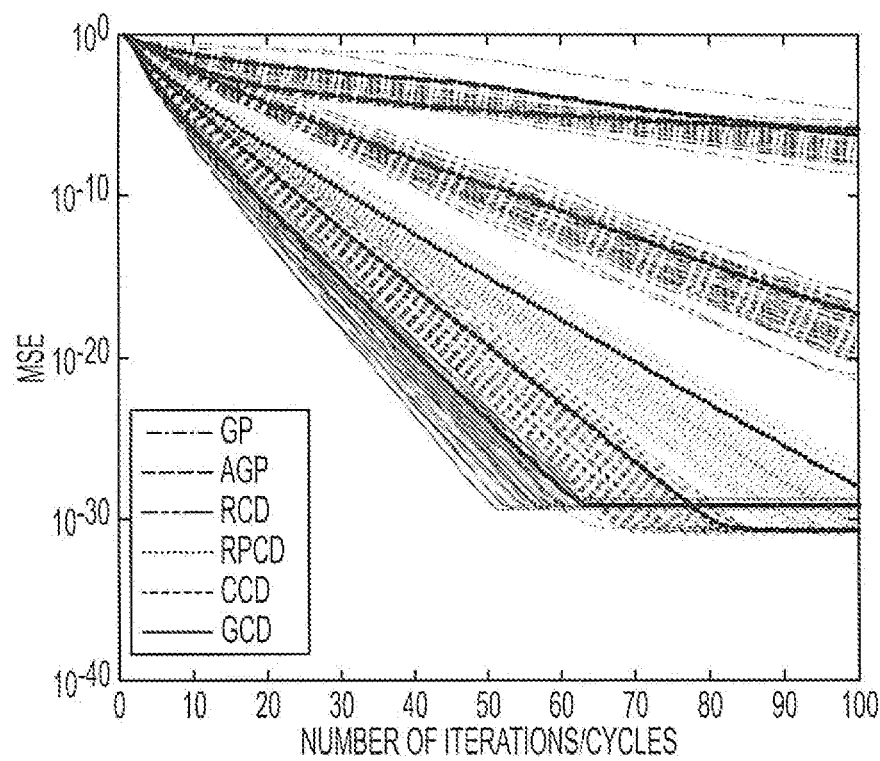
FIG. 7 shows another chart illustrating experimental results from a system implemented in accordance with aspects of the present disclosure.
Figure 8:
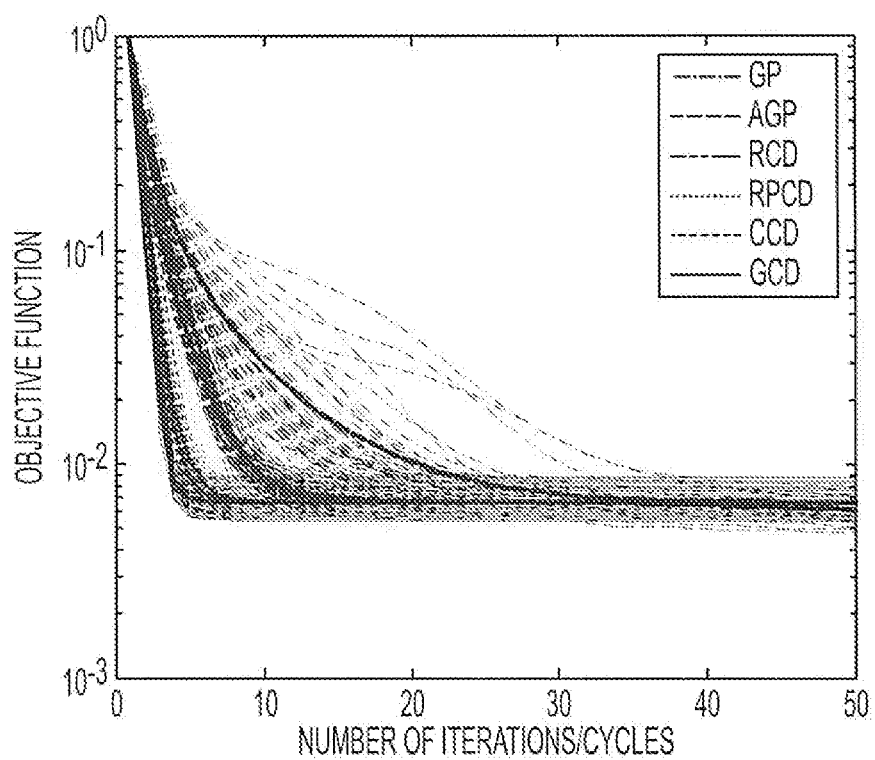
FIG. 8 shows yet another chart illustrating experimental results from a system implemented in accordance with aspects of the present disclosure.
Figure 9:
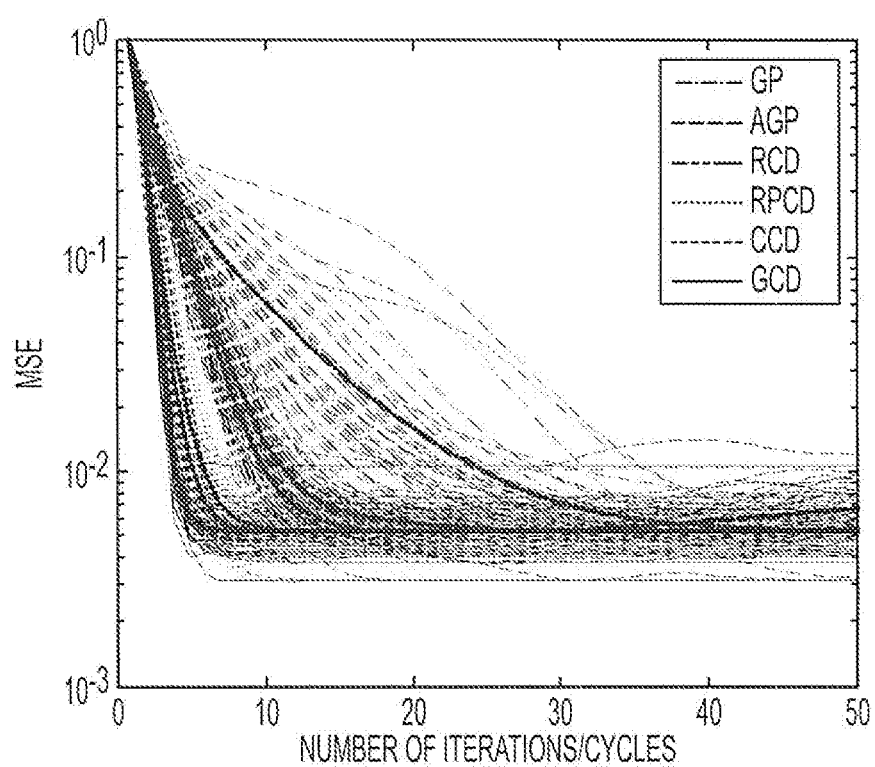
FIG. 9 shows yet another chart illustrating experimental results from a system implemented in accordance with aspects of the present disclosure.

FIG. 6 shows a plot of the objective reduction, and FIG. 7 shows a plot of the estimation error, versus the number of iterations/cycles in the absence of noise with 50 independent trials. The averaged results are also provided with thick lines. As can be seen, all processes converge to the true signal at a linear rate, and exactly recover the true signal. FIGS. 8 and 9 show the normalized objective function and estimation error, respectively, at SNR=20 dB. In both noise-free and noisy cases, the four CD processes disclosed herein converge faster than GP and AGP processes, which exploit full gradient. The AGP process converges faster than the GP process at the beginning stage of the iterations, but it becomes slower as the iteration progresses. Amongst all the shown process, the convergence speed of the GCD processes is shown to be the fastest.

The CD processes disclosed herein were tested on a computer with an Intel Core i3 2.20 GHz CPU and a 2 GB memory. The average running times (in seconds) of the CD (per cycle), GP and AGP (per iteration) were observed as $3.28 \times 10^{-3}$, $3.91 \times 10^{-3}$, and $4.22 \times 10^{-3}$, respectively. Hence, the complexity of one cycle in the CD processes, corresponding to n iterations, is indeed comparable to one iteration in the GP/AGP. Together with the fact that the CD needs fewer iterations to converge, the computational efficiency over the GP/AGP is thus demonstrated.

An under-determined scenario with m=80 and n=100 may also be considered. Even though there may be no noise, the unconstrained least squares solution may not recover x from the observation b since Ax=b may have infinitely many solutions and $A^\dagger b$ may not necessarily coincide with the true one. However, if the true signal is unimodular and this structural property is exploited, the UMLS can recover the true signal for m<n.

Figure 10:
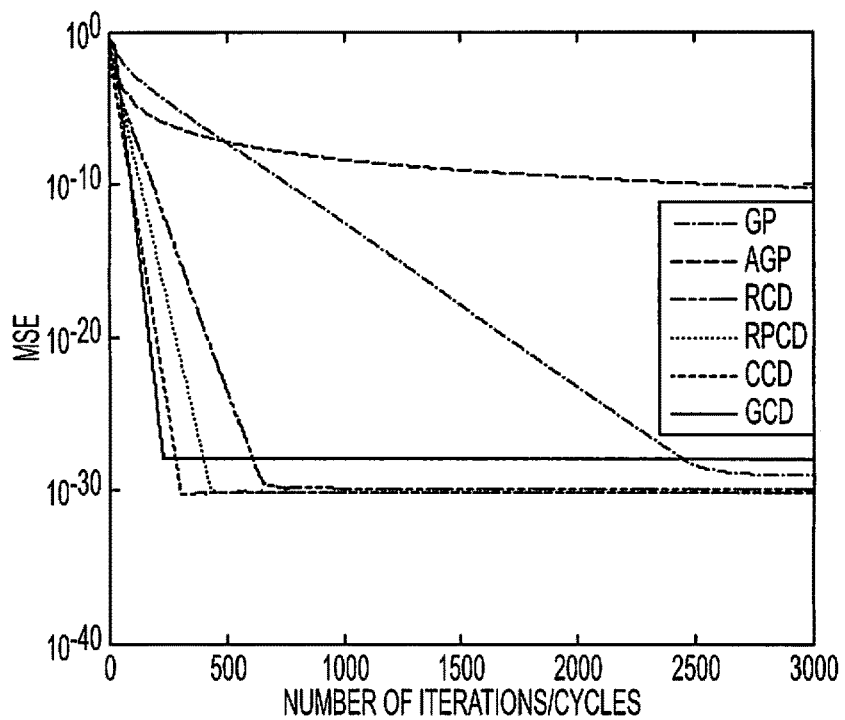
FIG. 10 shows yet another chart illustrating experimental results from a system implemented in accordance with aspects of the present disclosure.

FIG. 10 shows a plot of the estimation error versus the number of iterations/cycles, where the results are also based on 50 independent trials. As can be seen, the four CD processes disclosed herein, GP, and AGP all converge to the true solution since their estimation errors approach zero. Therefore, these processes exactly recover the true signal for (m, n)=(80, 100) by exploiting the unit—modulus property. Due to m<n, $A^H A$ is rank deficient. All processes may converge slower compared with the case of m≥n. Nonetheless, the four CD processes converge much faster than the GP and AGP processes. Note that the final accuracies with which the GCD and GP processes attain the signal may be $10^{-28}$ and $10^{-29}$, respectively, while that of the CCD, RCD, and RPCD processes may be $10^{-30}$. This may be because the GCD and GP processes require gradient calculation, which may involve pre-computing the matrix product $A^H A$. This matrix multiplication may harm the numerical stability and may result in the loss of one or two significant digits. This may also be a reason why a UMLS may not be converted to a UMQP. The CCD, RCD, and RPCD processes, which do not require the gradient, are more numerically stable than the GCD and GP.

The CD and GP processes may also be considered with respect to MIMO detection in the presence of white Gaussian noise. As the four CD processes discussed herein mainly differ in convergence rate, these processes may give the same results upon convergence. Therefore, to simplify the discussion herein, the following discussion focuses on the CCD process. The results of the zero-forcing (ZF) detector, which may apply hard decision to the unconstrained least squares solution $A^\dagger b$, may also be included.

Figure 11:
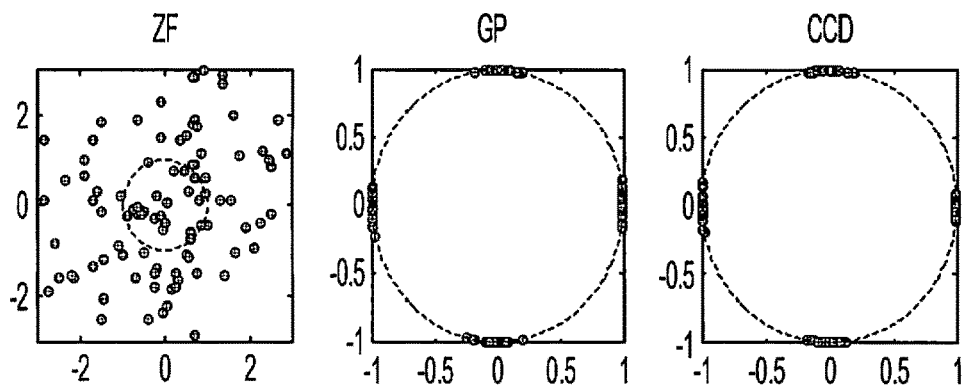
FIG. 11 shows yet another chart illustrating experimental results from a system implemented in accordance with aspects of the present disclosure.
Figure 11:
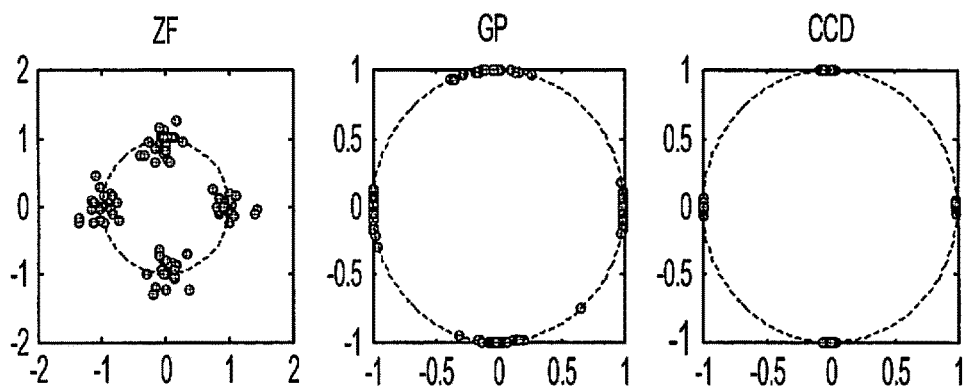
Figure 12:
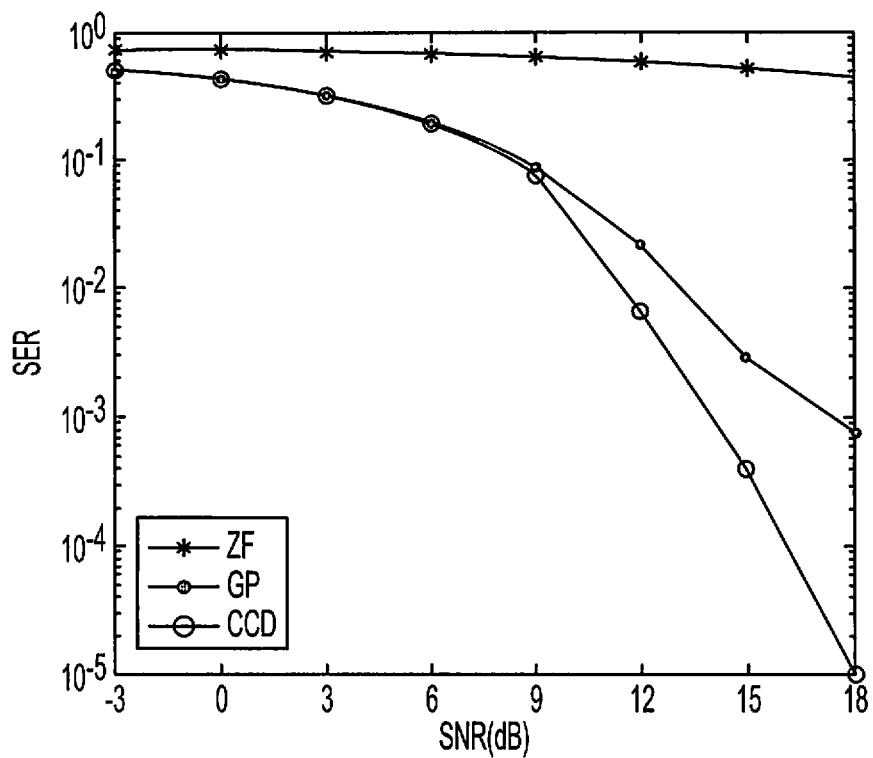
FIG. 12 shows yet another chart illustrating experimental results from a system implemented in accordance with aspects of the present disclosure.

The following discussion considers a MIMO system with m=n=100, while the transmitted signal adopts quadrature PSK (QPSK) modulation, namely, $x_i \in \{1, -1, j, -j\}$, and the observed vector is generated using b=Ax+v. FIG. 11 shows a plot of the soft decisions in one experiment, with the first and second rows showing the results at SNRs of 20 dB and 30 dB, respectively. As can be seen, the CCD and GP processes exhibit much tighter groupings than the ZF. FIG. 12 shows a plot of the symbol error rate (SER) versus SNR after hard decision is applied in all processes. As can be seen, the ZF performs unsatisfactorily while the CCD and GP processes have much lower SER. As shown, the CCD process performs the best.

With respect to source localization, the following discussion considers a deployment with n=4 receivers at known coordinates (−1, −2), (4, 6), (7, 3), and (5, 8), while the unknown source position may be (9, 12). It is noted that the source is located outside the convex hull of the four receivers and is far away from all the receivers, and such a source-receiver deployment is "harsh" for localization. The range measurements are generated according to (3) where $\{v_i\}_{i=1}^n$ are white Gaussian processes with variances $\sigma_{v,i}^2$, and they have the same SNR, which is defined as $\text{SNR}=\gamma_i^2/\sigma_{v,i}^2$. The root mean square error (RMSE) of the location estimate is adopted as the performance measure:

$$\text{RMSE}=\sqrt{E[\|(\hat{\alpha},\hat{\beta})-(\alpha,\beta)\|^2]} \tag{62}$$

where $(\hat{\alpha}, \hat{\beta})$ may be the position estimate obtained by a positioning method.

Figure 13:
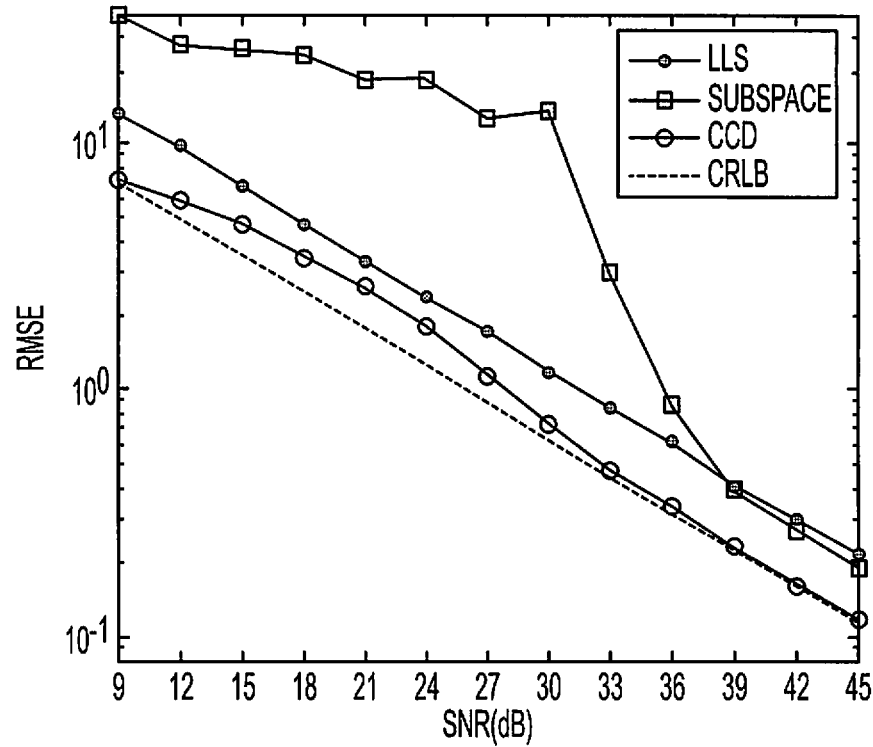
FIG. 13 shows yet another chart illustrating experimental results from a system implemented in accordance with aspects of the present disclosure.

All simulation results are based on an average of 1000 independent trials. The CCD process first solves the UMLS problem (9) and then finds the position estimate via (10). Comparison with two standard schemes, namely, linear least squares (LLS) and subspace methods, as well as root Cramér-Rao lower bound (CRLB) is also made. The results are shown in the chart illustrated in FIG. 13 and the near-optimality of the CD process, as well as its superiority over the LLS and subspace estimators are observed.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Functional blocks and modules in FIGS. 1-5 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integrated within the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skills in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of communications in a wireless communication system, the communications including operations expressed as a function of a signal vector subject to a unit-modulus constraint, the method comprising:
   receiving at least one signal from a transmitter, the at least one signal including information about at least one characteristic of the communications, wherein the at least one characteristic includes one or more of: at least one transmission symbol, a location of the source of the at least one signal, a phase synchronization, and a phase-only beamforming;
   constructing the signal vector based on the at least one signal received from the transmitter;
   determining the at least one characteristic of the at least one signal, wherein the determining comprises iteratively minimizing the function of the signal vector over coordinate values associated with the at least one signal to a convergence point, wherein the iteratively minimizing includes:
      selecting, at a current iteration of the operations, a coordinate index corresponding to a vector element of the signal vector;
      applying, at the current iteration, minimizing operations to the function of the signal vector with respect to the vector element corresponding to the selected coordinate index, wherein the minimizing operations result in an optimal value for the vector element corresponding to the selected coordinate index with respect to a next iteration, the next iteration being subsequently adjacent to the current iteration, and wherein vector elements corresponding to coordinate indices different than the selected coordinate index are not changed by the minimizing operations in the current iteration;
      updating a residual value of the function of the signal vector, with respect to the next iteration, based on the optimal value for the vector element, wherein updating the residual value of the next iteration includes a scalar-vector multiplication operation of the optimal value for the vector element; and
      determining, when the function of the signal vector is determined to converge to the convergence point, the at least one characteristic of the signal, wherein the determining includes at least one of:
         detecting symbols in the signals corresponding to the vector elements of the converged signal vector;
         localizing the location of the source of the at least one signal;
         performing phase synchronization; and
         performing phase-only beamforming.

2. The method of claim 1, wherein selecting the coordinate index corresponding to the vector element includes selecting the coordinate index from a set of coordinate index values, wherein each coordinate index value in the set of coordinate index values corresponds to a different vector element of the signal vector.

3. The method of claim 2, wherein the coordinate index values in the set of coordinate index values are sequentially ordered, and wherein selecting the coordinate index includes selecting the coordinate index based on a cyclical rule in which the coordinate index is selected, at each iteration of the operations, sequentially from the set of coordinate index values, and wherein, upon reaching the sequential end of the coordinate index values in the set of coordinate index values, a first sequential coordinate index value in the set of coordinate index values is selected in a corresponding iteration.

4. The method of claim 2, wherein selecting the coordinate index includes selecting the coordinate index based on a random rule in which the coordinate index is randomly selected, at each iteration of the operations, from the set of coordinate index values.

5. The method of claim 1, wherein selecting the coordinate index includes selecting the coordinate index based on a randomly permuted rule in which the coordinate index is randomly selected, at each iteration of the operations, from a set of coordinate index values, and wherein each coordinate index value in the set of coordinate index values is selected only once per cycle, the cycle corresponding to a number of iterations equal to a number of coordinate index values in the set of coordinate index values.

6. The method of claim 1, wherein the operations to solve the function of the signal vector subject to the unit-modulus constraint is formulated as a unit-modulus least squares (UMLS) problem and is expressed as $$\min_{x \in \mathbb{C}^n} f(x) := \|Ax - b\|^2,$$

s.t. $|x_i|^2 = 1$, $i=1, \ldots, n$, where $f(x)$ is the function of the signal vector, x is the signal vector, i is the coordinate index, $x_i$ is the vector element corresponding to the selected coordinate index, A is a given matrix, b is a given observation vector, and n is a number of vector elements of the signal vector.

7. The method of claim 6, wherein the minimizing operations of the function of the signal vector include computing the optimal value for the vector element corresponding to the selected coordinate index with respect to a next iteration in accordance with exponential formulation of a complex number $$x_{i_k}^{k+1} = e^{j \angle \left( a_{i_k}^H d_{i_k} \right)},$$

where k is the current iteration, $i_k$ is the selected coordinate index, e is the exponential function, $a_{i_k}$ is the $i_k$ column of given matrix A, $a_{i_k}^H$ is a Hermitian of $a_{i_k}$, and $$d_{i_k} = x_{i_k}^k a_{i_k} - r^k,$$

where $r^k$ is the residual of the function of the signal vector with respect to the current iteration.

8. The method of claim 7, wherein updating the residual of the function of the signal vector with respect to the next iteration is in accordance with $r^{k+1} = r^k + (x_{i_k}^{k+1} - x_{i_k}^k) a_{i_k}$, where $r^{k+1}$ represents the residual of the function of the signal vector with respect to the next iteration.

9. The method of claim 6, further comprising initializing, at an initial iteration, the signal vector, wherein an initial value of the signal vector is selected as one of: zero, and a value representing a solution to an unconstrained least squares solution expressed as $x^o = A^\dagger b$, where $x^o$ is the initial value of the signal vector.

10. The method of claim 9, further comprising computing, at the initial iteration, an initial residual value $r^o$ for the function of the signal vector, wherein the initial residual value $r^o$ is based on the initial value of the signal vector $x^o$ and based on the given matrix A, wherein computing the initial residual value $r^o$ is in accordance with $r^0 = Ax^0 - b$.

11. The method of claim 1, further comprising:
   determining if a termination condition has been met; and
   outputting, when determining that the termination condition has been met, the signal vector, wherein the signal vector includes a value representing the convergence point of the function of the signal vector due to the operations.

12. The method of claim 11, wherein the termination condition is determined to be met when the function of the signal vector converges to the convergence point within some predetermined value, wherein whether the function of the signal vector converges to the convergence point is determined based on a difference of the square of the norm of the residual of the function with respect to the current iteration and the square of the norm of the residual of the function with respect to the next iteration, wherein the termination condition is expressed as $\|r^k\|^2 - \|r^{k+1}\|^2 < TOL$, where $r^k$ is the residual of the function of the signal vector with respect to the current iteration, $r^{k+1}$ is the residual of the function of the signal vector with respect to the next iteration, and TOL is the predetermined value.

13. The method of claim 1, wherein selecting the coordinate index corresponding to the vector element includes:
   computing a dual variables vector corresponding to the selected coordinate index with respect to the current iteration; and
   computing an arg max of a gradient of the function of the signal vector with respect to the current iteration based on a product of the vector element corresponding to the selected coordinate index and the dual variables vector corresponding to the selected coordinate index, wherein the arg max of the gradient results in a coordinate index for which the gradient of the function yields a largest absolute value.

14. The method of claim 13, further comprising:
   updating the dual variables vector corresponding to the selected coordinate index with respect to the next iteration; and
   updating the gradient of the function of the signal vector with respect to the next iteration.

15. The method of claim 14, wherein updating the dual variables vector is in accordance with $$\lambda_{i_k}^{k+1} = |a_{i_k}^H d_{i_k}| - \|a_{i_k}\|^2,$$

where $\lambda_{i_k}^{k+1}$ is a dual variables vector component of the dual variables vector with respect to the next iteration, $x_i$ is the vector element corresponding to the selected coordinate index, $i_k$ is the selected coordinate index, $a_{i_k}$ is the $i_k$ column of a given matrix A, $a_{i_k}^H$ is a Hermitian of $a_{i_k}$, and $$d_{i_k} = x_{i_k}^k a_{i_k} - r^k,$$

where $r^k$ is the residual of the function of the signal vector with respect to the current iteration.

16. The method of claim 14, wherein updating the gradient of the function of the signal vector is in accordance with $$\nabla f(x^{k+1}) = \nabla f(x^k) + (x_{i_k}^{k+1} - x_{i_k}^k) A^H a_{i_k},$$

where $\nabla f(x^{k+1})$ is the gradient of the dual variables vector with respect to the next iteration, $\nabla f(x^k)$ is the gradient of the dual variables vector with respect to the current iteration, $$x_{i_k}^{k+1}$$

is the vector element corresponding to the selected coordinate index with respect to the next iteration, $$x_{i_k}^k$$

is the vector element corresponding to the selected coordinate index with respect to the current iteration, $a_{i_k}$ is the $i_k$ column of a given matrix A, and $A^H$ is a Hermitian of given matrix A.

17. The method of claim 1, wherein the function of the signal vector subject to the unit-modulus constraint is associated with one of: multiple-input multiple-output (MIMO) symbol detection operations, localization of a signal source operations, signal phase synchronization operations, and phase-only beamforming operations.

18. A method of communications in a wireless communication network in which at least one operation is expressed as one of a unit-modulus least squares (UMLS) and unit-modulus quadratic program (UMQP) problems, wherein the one of a UMLS and UMQP problem expression includes a function of a signal vector subject to a unit-modulus constraint, the method comprising:
   receiving at least one signal from a transmitter, the at least one signal including information about at least one characteristic of the communications, wherein the at least one characteristic includes one or more of: at least one transmission symbol, a location of the source of the at least one signal, a phase synchronization, and a phase-only beamforming;
   constructing the signal vector based on the at least one signal received from the transmitter;
   determining the at least one characteristic of the at least one signal, wherein the determining comprises iteratively minimizing a function of the signal vector over a set of coordinates to a convergence point, wherein the iteratively minimizing includes:
     receiving as input a given matrix and a given vector;
     initializing the signal vector with an initial vector value;
     constructing a vector based on the given matrix, the given vector, and the signal vector;
     selecting, at a current iteration of the iteratively minimizing, a coordinate index corresponding to a vector element of the signal vector;

applying, at the current iteration, minimizing operations to the function of the signal vector with respect to the vector element corresponding to the selected coordinate index, wherein the minimizing operations result in an optimal value for the vector element corresponding to the selected coordinate index with respect to a next iteration, the next iteration being subsequently adjacent to the current iteration, and wherein vector elements corresponding to coordinate indices different than the selected coordinate index are not changed by the minimizing operations in the current iteration;

updating the vector constructed based on the given matrix and the signal vector with respect to the next iteration, wherein updating the vector includes a scalar-vector multiplication operation of the sum of the vector element optimized with respect to the next iteration and the vector element optimized with respect to the current iteration, and a particular column of the given matrix; and determining, when the function of the signal vector is determined to converge to the convergence point, the at least one characteristic of the signal, wherein the determining includes at least one of:
  detecting symbols in the signals corresponding to the vector elements of the converged signal vector;
  localizing the location of the source of the at least one signal;
  performing phase synchronization; and
  performing phase-only beamforming.

19. The method of claim 18, wherein the minimizing operations of the function of the signal vector include computing the optimal value for the vector element corresponding to the selected coordinate index with respect to a next iteration in accordance with exponential formulation of a complex number $$x_{i_k}^{k+1} = e^{j\angle -(t_{i_k} + v_{i_k})},$$

where k is the current iteration, $i_k$ is the selected coordinate index, e is the exponential function, v is the given vector, $v_{i_k}$ is the $i_k$ element of given vector v, and $$t_{i_k} = h_{i_k}^k - x_{i_k}^k c_{i_k i_k},$$

where h is the constructed vector.

20. An apparatus for wireless communication in a multiple-input multiple-output (MIMO) wireless communications network, the apparatus comprising:
a memory; and
at least one processor coupled to the memory, the at least one processor configured to:
  receive, by at least one receiving module of a plurality of receiving modules, a plurality of signals via a MIMO channel, each signal of the plurality of signals including transmission symbols, each signal associated with a coordinate value corresponding to a respective transmission source path, wherein each signal is used to construct a signal vector, wherein each vector element of the signal vector corresponds to a particular signal associated with a particular transmission source path; and
  detect the transmission symbols at each of the plurality of receiving modules, wherein the detection of the transmission symbols comprises iteratively minimizing a function of the signal vector over the coordinate values associated with the plurality of signals to a convergence point, wherein the iteratively minimizing includes:
    selecting, at a current iteration, a coordinate index corresponding to a coordinate associated with the signal received via a particular transmission source path;
    applying, at the current iteration, minimizing operations to the function of the signal vector with respect to the vector element corresponding to the selected coordinate index, wherein the minimizing operations result in an optimal value for the vector element corresponding to the selected coordinate index with respect to a next iteration, the next iteration being subsequently adjacent to the current iteration, and wherein vector elements corresponding to coordinate indices different than the selected coordinate index are not changed by the minimizing operations in the current iteration;
    updating a residual of the function of the signal vector, with respect to the next iteration, based on the optimal value for the vector element, wherein updating a residual value of the next iteration includes a scalar-vector multiplication operation of the optimal value for the vector element;
    determining whether the function of the signal vector has converged to the convergence point within a predetermined threshold; and
    detecting, when the function of the signal vector has been determined to converge to the convergence point within the predetermined threshold, symbols in the signals corresponding to the vector elements of the converged signal vector.

* * * * *

UNITED STATES PATENT AND TRADEMARK OFFICE
CERTIFICATE OF CORRECTION

PATENT NO. : 10,579,702 B2
APPLICATION NO. : 15/957657
DATED : March 3, 2020
INVENTOR(S) : Zeng et al.

It is certified that error appears in the above-identified patent and that said Letters Patent is hereby corrected as shown below:

In the Specification

At Column 15, Line number 64, Table 1, delete "$x_{i_k}^{k+1} = \mathbf{cj} \angle (a_{i_k}^{11} d_{i_k})$" and replace with --$x_{i_k}^{k+1} = e^{j\angle (a_{i_k}^{H} d_{i_k})}$--.

At Column 20, Line number 3, Table 2, delete "Update primal $\lambda_{i_k}^{k+1} = c^{j\angle (a_{i_k}^{H} d_{i_k})}$" and replace with --Update primal $x_{i_k}^{k+1} = e^{j\angle (a_{i_k}^{H} d_{i_k})}$--.

At Column 21, Line number 28, Table 3, delete "$x_{i_k}^{k+1} = \mathbf{cj} \angle - (t_{i_k} + v_{i_k})$" and replace with --$x_{i_k}^{k+1} = e^{j\angle - (t_{i_k} + v_{i_k})}$--.

At Column 23, Line number 17, Equation 48, delete the portion of the equation reading "$(|a_{i_k}^{H} d_{i_k}| - \text{Re}((x_{i_k}^{k})^{*} a_{i_k}^{k} d_{i_k}))$" and replace with --$(|a_{i_k}^{H} d_{i_k}| - \text{Re}((x_{i_k}^{k})^{*} a_{i_k}^{H} d_{i_k}))$--.

At Column 23, Line number 25, Equation 49, delete the portion of the equation reading "$|a_{i_k}^{k} d_{i_k}|$" and replace with --$|a_{i_k}^{H} d_{i_k}|$--.

At Column 23, Line number 37, Equation 50, delete the portion of the equation reading "$|a_{i_k}^{k} d_{i_k}|$" and replace with --$|a_{i_k}^{H} d_{i_k}|$--.

Signed and Sealed this
Twenty-first Day of July, 2020

Andrei Iancu
*Director of the United States Patent and Trademark Office*

CERTIFICATE OF CORRECTION (continued)
U.S. Pat. No. 10,579,702 B2

At Column 24, Line number 65, Equation 58, delete the portion of the equation reading "$(x^k, x^{k+1})$" and replace with --$(x^k, \lambda^{k+1})$--.

In the Claims

At Column 31, Claim number 12, Line number 27, delete "$\|r^k\|^2 - \|r^{+1}\|^2 < TOL$" and replace with --$\|r^k\|^2 - \|r^{k+1}\|^2 < TOL$--.